(12) United States Patent
Williams et al.

(10) Patent No.: US 6,427,030 B1
(45) Date of Patent: Jul. 30, 2002

(54) METHOD AND SYSTEM FOR IMAGE CONVERSION UTILIZING DYNAMIC ERROR DIFFUSION

(75) Inventors: Leon C. Williams, Walworth; Jeng-Nan Shiau, Webster; David J. Metcalfe, Marion, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/285,324

(22) Filed: Aug. 3, 1994

(51) Int. Cl.[7] .................................................. G06K 9/46
(52) U.S. Cl. ....................... 382/252; 382/299; 358/429; 358/455
(58) Field of Search ................................. 358/429, 445, 358/447, 455–458, 461; 382/237, 252, 299, 176

(56) References Cited

U.S. PATENT DOCUMENTS

| | | | | | |
|---|---|---|---|---|---|
| 4,339,774 A | * | 7/1982 | Temple | ........................ | 358/283 |
| 4,760,463 A | * | 7/1988 | Nonoyama et al. | ......... | 358/280 |
| 4,780,709 A | * | 10/1988 | Randall | ........................ | 340/721 |
| 4,829,587 A | * | 5/1989 | Glazer et al. | .................. | 382/47 |
| 4,887,163 A | * | 12/1989 | Maeshima | .................. | 358/443 |
| 4,897,803 A | * | 1/1990 | Calarco et al. | .............. | 364/518 |
| 4,924,332 A | * | 5/1990 | Dwyer et al. | .............. | 360/72.2 |
| 4,951,231 A | * | 8/1990 | Dickinson et al. | .......... | 364/521 |
| 4,955,065 A | * | 9/1990 | Ulichney | ..................... | 382/50 |
| 5,077,615 A | * | 12/1991 | Tsuji | ........................... | 358/298 |
| 5,258,854 A | * | 11/1993 | Eschbach | .................... | 358/445 |
| 5,260,810 A | * | 11/1993 | Kanno et al. | ................ | 358/455 |
| 5,307,180 A | * | 4/1994 | Williams et al. | ............. | 358/448 |
| 5,307,426 A | * | 4/1994 | Kanno et al. | ................ | 358/461 |
| 5,327,256 A | * | 7/1994 | Kang et al. | .................. | 382/299 |
| 5,410,615 A | * | 4/1995 | Mailloux | ..................... | 382/299 |
| 5,481,372 A | * | 1/1996 | Kouno et al. | ................ | 382/176 |

FOREIGN PATENT DOCUMENTS

| | | | | |
|---|---|---|---|---|
| EP | 0602854 | * | 12/1993 | ............. H04N/1/40 |
| EP | 0667704 | * | 2/1995 | ........... H04N/1/405 |
| JP | 0389164 | * | 3/1990 | ........... H04N/1/387 |

OTHER PUBLICATIONS

IEEE Global Telecommunications Conference, Globecon '91, Dec. 2–5, 1991, Phoenix, Arizona (US), Conference Record, vol. 1, 1991, XP000325957, pp. 104–109, M. Yoshida et al.: "Bi–level Rendition of Images Containing Text, Screened Halftone and Continuous Tone".*

* cited by examiner

Primary Examiner—Matthew Bella

(57) ABSTRACT

A method and system implements a dynamic error diffusion process. A grey level value representing a pixel is received. An image segmentation circuit determines an image characteristic of the pixel being processed. A threshold circuit thresholds the grey level value (pixel) and generates an error value as a result of the threshold process. A portion of the error value is diffused to adjacent pixels on a next scanline. The distribution of this error value is dynamic in that different sets of weighting coefficients are used based the image characteristic of the processed pixel. One set of coefficients are utilized in processing a pixel having a first image characteristic, and a second set of coefficients are utilized in processing a pixel having a second image characteristic.

15 Claims, 36 Drawing Sheets

| × | × | × | × | × |
|---|---|---|---|---|
| × | × | × | Err 1 | 1/2 Err 2 |
| 1/16 Err 7 | 1/16 Err 6 | 1/8 Err 5 | 1/4 Err 4 | 0 Err 3 |

FIG. 5

| × | × | × | × | × |
|---|---|---|---|---|
| × | × | × | Err 1 | 1/2 Err 2 |
| 0 Err 7 | 0 Err 6 | 1/4 Err 5 | 0 Err 4 | 1/4 Err 3 |

FIG. 6

| × | × | Err 1 | 7/48 Err 2 | 5/48 Err 3 |
|---|---|---|---|---|
| 3/48 Err 4 | 5/48 Err 5 | 7/48 Err 6 | 5/48 Err 7 | 3/48 Err 8 |
| 1/48 Err 9 | 3/48 Err 10 | 5/48 Err 11 | 3/48 Err 12 | 1/48 Err 13 |

FIG. 7

|       | Err  | 7/16 Err |
|-------|------|----------|
|       | 1    | 2        |
| 3/16 Err | 5/16 Err | 1/16 Err |
| 5     | 4    | 3        |

FIG. 8

|          |          | Err      | 7/24 Err | 1/24 Err |
|----------|----------|----------|----------|----------|
|          |          | 1        | 2        | 3        |
| 1/24 Err | 3/24 Err | 5/24 Err | 1/24 Err | 1/48 Err |
| 4        | 5        | 6        | 7        | 8        |
| 1/48 Err | 1/24 Err | 3/48 Err | 1/48 Err |          |
| 9        | 10       | 11       | 12       |          |

FIG. 9

$$\text{Actual Output} = \frac{a*255}{N}$$

| 64 | 192 | 128 | 64 | 192 | 128 | 64 | 192 | 128 |
|---|---|---|---|---|---|---|---|---|
| 64 | 192 | 128 | 64 | 192 | 128 | 64 | 192 | 128 |
| 64 | 192 | 128 | 64 | 192 | 128 | 64 | 192 | 128 |
| 64 | 192 | 128 | 64 | 192 | 128 | 64 | 192 | 128 |

| 64 | 192 | 128 | 64 | 192 | 128 | 64 |
|---|---|---|---|---|---|---|
| 128 | 64 | 192 | 128 | 64 | 192 | 128 |
| 192 | 128 | 64 | 192 | 128 | 64 | 192 |
| 64 | 192 | 128 | 64 | 192 | 128 | 64 |

FIG. 50 *Prior Art*

METHOD AND SYSTEM FOR IMAGE CONVERSION UTILIZING DYNAMIC ERROR DIFFUSION

FIELD OF THE PRESENT INVENTION

The present invention is directed to the reduction of the number of levels of a multilevel grey scale pixel value representing an image to a number of levels renderable by an output device utilizing dynamic error diffusion. More specifically, the present invention is directed to a dynamic error diffusion process wherein the error diffusion weighting coefficients are dynamically established based on a physical characteristic of the image data being processed.

BACKGROUND OF THE PRESENT INVENTION

Image information, be it color or black and white, is derived by scanning, initially at least, in a grey level format containing a large number of levels; e.g., 256 levels of black and white and more than 16 million levels or color, thus, grey level image data may be presented as a large multi-level value. The large multi-level value is usually unprintable by standard printers since standard printers print a limited number of levels, either a spot or no spot in a binary printer, or a limited number of levels associated with the spot, for example, four in the quaternary case. Accordingly, it is necessary to reduce the multi-level grey image data to a limited number of levels so that it is printable.

There are many methods of rendering multi-level input grey images on a low level output device. One standard method of converting grey level pixel image data to binary level pixel image data is through the use of dithering or halftoning processes. In such arrangements, over a given area, each grey level pixel within the area is compared to one of a set of preselected thresholds. The effect of such an arrangement is that, for an area where the image is grey, some of the thresholds will be exceeded, while others are not. In the binary case, the pixels in the area in which the threshold is exceeded are printed as black, while the remaining pixels are allowed to remain white. The effect of the distribution of black and white over the the given is integrated by the human eye as grey. Dithering presents problems, however, in that the amount of grey within an original image is not maintained over an area, i.e., the error arising from the difference between the threshold value and the actual grey level value at any particular cellpixel is simply thrown away. This results in loss of image information.

Algorithms that convert grey images to binary or other number of level images while attempting to preserve the local density exists include among them error diffusion. Error diffusion can render complex images that contain a mixture of text and picture data reasonably well. The utilization of error diffusion can eliminate the need to have image segmentation which identifies which image data, pixel, corresponds to text and which image data, pixel, corresponds to a picture. Normally, this identification process is necessary so that the picture aspect of the document can be screened and the text aspect of the document can be threshold.

An example of a typical error diffusion process is fully described in U.S. patent application, Ser. No. 07/600, 542, entitled "Method for Image Conversions With Error Diffusion." The entire contents of this U.S. patent application, Ser. No. 07/600, 542, are hereby incorporated by reference. More examples of error diffusion processes with modifications to the error calculation and weight allocation are fully described in U.S. Pat. No. 4,924,322 to Kurosawa et. al., U.S. Pat. No. 4,339,774 to Temple, and U.S. Pat. No. 4,955,065, to Ulichney. The entire contents of U.S. Pat. No. 4,924,322, U.S. Pat. No. 4,339,774, and U.S. Pat. No. 4,955,065 are hereby incorporated by reference.

Error diffusion attempts to maintain grey by making the conversion from grey pixels to binary or other level pixels on a pixel-by-pixel basis. The procedure examines each pixel with respect to a threshold, and the difference between the grey level pixel value and the threshold is then forwarded to a selected group of neighboring pixels, in accordance with a weighting scheme.

FIG. 1 illustrates a typical error diffusion circuit. As illustrated in FIG. 1, image data is fed into a threshold circuit 1 along with a threshold value. The threshold circuit 1 compares the image data with the threshold value to determine whether the image data is equal to or greater than the threshold value. In a binarization case, if the image data is greater than or equal to the threshold value, the threshold circuit 1 outputs image data equal to a logical 1 value. On the other hand, if the image data is less than the threshold value, the threshold circuit 1 outputs a logical 0 value.

In this thresholding process, an error value is generated by the threshold circuit 1. This error value is fed into an error distribution circuit 3 wherein the error term is multiplied by a plurality of weighting coefficients, wherein each weighting coefficient is associated with a certain pixel that is to receive a portion of the error value. In other words, the error distribution circuit 3 distributes the error generated by the threshold circuit 1 to pixels which are adjacent to the pixel being presently processed according to a set of weighting coefficients.

As noted above, typically when utilizing error diffusion, there is not a need to utilize image segmentation. This is due to the fact that typical error diffusion can render an image of acceptable quality not withstanding the characteristics of the image data being processed. This is due in part to the fact that the error from the threshold process is distributed to adjacent or downstream pixels. However, an important aspect of the error diffusion process is the weighting of this distribution of the error to neighboring pixels to ensure the rendering of an acceptable quality image.

FIGS. 7–9 show known distribution and weighting schemes. The distinction between the weighting and distribution schemes shown is in the size of the error distribution matrix or number of neighboring pixels over which error is distributed, which also requires somewhat different weighting schemes. In these Figures, as well as in other Figures showing error diffusion matrices, each cell shows the weighting value.

In conventional image rendering devices utilizing error diffusion, the set of weighting coefficients for the error diffusion process is selected in the design stage wherein the same weighting coefficients are used in processing all image types. A problem noted with the selection of a single set of error diffusion weighting coefficients for a standard error diffusion algorithm is production of different artifacts in regions of differing image types or image processing operations. These artifacts can affect the appearance quality of the image being rendered because the selection of the set of weighting coefficients results from the balancing of desired image quality for a particular image type and the actual image quality generated by the image rendering device. In other words, one set of weighting coefficients may produce a high quality image for halftone images, but render an image of lower quality for text data; whereas another set of weighting coefficients may render a high quality image for continuous tone image data, but render an image of lower quality for halftone image data. Thus, it is desirable to utilize an error diffusion process which is capable of optimizing the image quality for all different types of image characteristics and image types.

SUMMARY OF THE PRESENT INVENTION

One aspect of the present invention is a method of diffusing an error generated from thresholding a grey level value representing a pixel. The method determines an image characteristic of a pixel within an image and thresholds the pixel. An error value is generated as a result of the threshold process. A set of weighting coefficients is selected from a plurality of possible weighting coefficient sets based on the image characteristic of the pixel and the error value is diffused to adjacent pixels based on the selected set of weighting coefficients.

A second aspect of the present invention is a system for diffusing an error generated from thresholding a grey level value representing a pixel. The system includes image segmentation means for determining an image characteristic of a pixel within an image and threshold means for thresholding the pixel and for generating an error value as a result of the thresholding process. Coefficient means, operatively connected to the image segmentation means, generates a set of weighting coefficients from a plurality of possible weighting coefficient sets based on the image characteristic of the pixel. Diffusing means, operatively connected to the threshold means and coefficient means, diffuses the error value to adjacent pixels based on the generated set of weighting coefficients.

A third aspect of the present invention is a method of binarizing a multi-level pixel. The method identifies areas of an image to be processed by a set of first image processing operations and areas of the image to be processed by a set of second image processing operations. The multi-level pixel is processed with the set of first image processing operations when the multi-level pixel is in an area identified as to be processed by the set of first image processing operations and an error and binary value are generated therefrom. The multi-level pixel is processed with the set of second image processing operations when the multi-level pixel is in an area identified as to be processed by the set of second image processing operations and an error and binary value are generated therefrom. A weighted portion of the error is diffused to unprocessed pixels based on a first set of weighting coefficients when the multi-level pixel is processed by the set of first image processing operations. A weighted portion of the error is diffused to unprocessed pixels based on a second set of weighting coefficients when the multi-level pixel is processed by the set of second image processing operations.

A fourth aspect of the present invention is a printing system for rendering marks on a receiving medium. The system includes receiving means for receiving a pixel having a first resolution and first image processing means for screening the pixel with a predetermined screen. Second image processing means converts the pixel to a second resolution higher than the first resolution and third image processing means binarizes the pixel so as to output a binary signal and an error, the error having a resolution equal to the first resolution. Image segmentation means, operatively connected to the receiving means, the first image processing means, the second image processing means, and the third image processing means, determines an image characteristic of a pixel within an image and controls the operations of the first, second and third image processing means. Coefficients means, operatively connected to the image segmentation means, generates a first set of weighting coefficients when the first, second and third image processing means are operated in sequence and generates a second set of weighting coefficients when the second and third image processing means are operated in sequence and the first image processing means is rendered nonoperational by the image segmentation means. Diffusing means, operatively connected to the coefficients means, diffuses the error to adjacent pixels based on the set of weighting coefficients generated by the coefficients means, and rendering means converts the binary signal into a mark on the receiving medium.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only, and should not be limitative of the scope of the present invention, wherein:

FIGS. 5–9 illustrate various sets of weighting coefficients that can be utilized in the present invention;

DETAILED DESCRIPTION OF THE DRAWINGS

Figure 1:
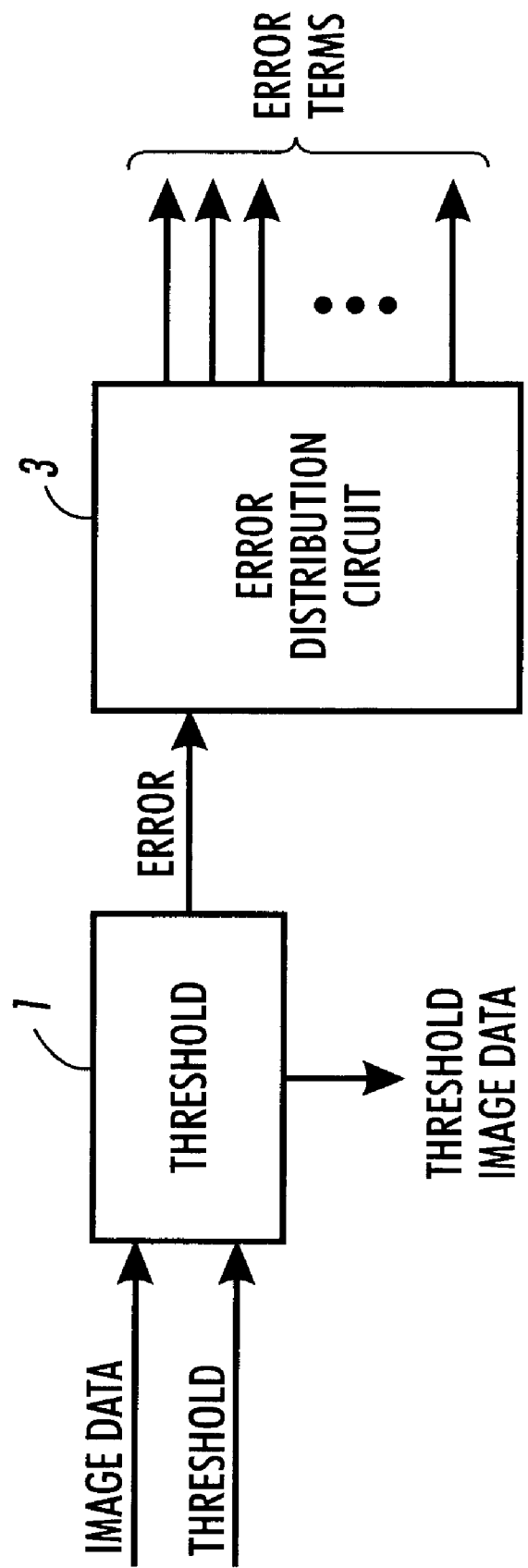
FIG. 1 shows a block diagram illustrating a typical error diffusion circuit.

The following will be a detailed description of the drawings illustrating the present invention. In this description, as well as in the drawings, like reference numerals represent like devices, circuits, or equivalent circuits which perform the same or equivalent functions.

In describing the present invention, it is assumed that the video signal has a value and a range between 0 and 255. However, any range for the video signal can be utilized in conjunction with the present invention. Moreover, in the following description, the term grey level will be used to described both black and white and color applications.

Also, in describing the present invention, the terms pixel and subpixel will be utilized. These terms may refer to an electrical (or optical, if fiber optics are used) signal which represents the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represents the physically measurable optical properties at a physically definable area on a display medium. A plurality of the physically definable areas for both situations represent the physically measurable optical properties of an entire physical image to be rendered by either a material marking device, electrical or magnetic marking device, or optical display device. Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

As discussed above, in typical error diffusion methods, the printing of the pixel is determined by comparing a modified input video signal with a threshold value. The modified input video signal is a sum of an input video signal plus an accumulated error term determined from the processing of previous pixels. If the modified input video of the pixel is greater than or equal to the threshold, the output is a logical 1 value and an error term of input video signal plus the accumulated error term minus highest possible video signal value is propagated to the downstream pixels. If the modified input video signal is less than the threshold value, the logical output is 0 and an error term of the input video signal plus the accumulated error term is propagated to downstream pixels.

Figure 2:
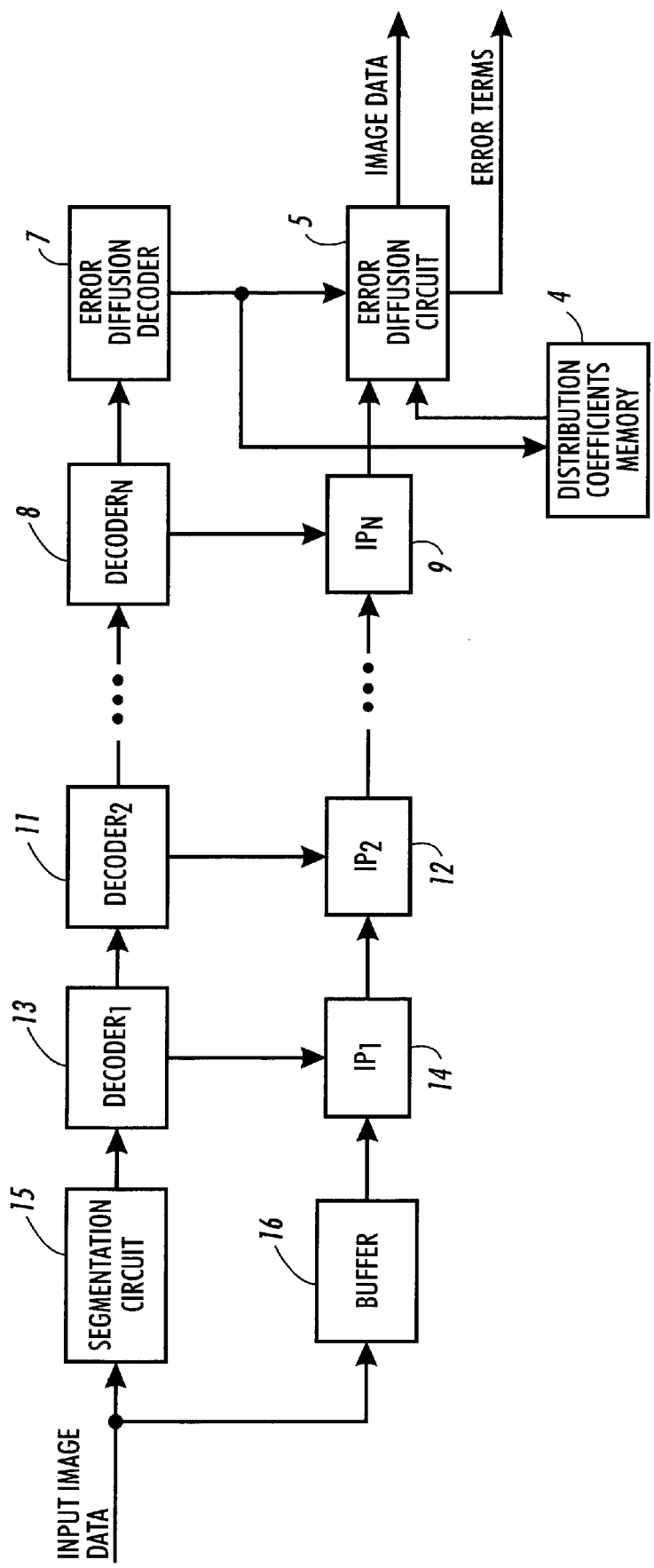
FIG. 2 shows a block diagram illustrating an image processing subsystem's architecture of the preferred embodiment of the present invention.

To extend the typical static error diffusion process to be a dynamic error diffusion process, the error diffusion process must be responsive to information indicating the characteristics of the image data being presently processed and be able to modify or change the distribution of the error to be propagated to downstream pixels based on this information. An example of such a dynamic error diffusion circuit is illustrated in FIG. 2.

It is noted that the present invention will be described for a binary system. However, the concepts of the present invention are readily applicable to any level system.

A segmentation circuit 15 receives image data from a scanner or other image data producing device. The segmentation circuit 15 analyzes the image data to determine the characteristic of the image data or image type. At the same time, the image data is also temporarily stored in a buffer 16. Upon determining the image type, the segmentation circuit 15 generates an effect dataword which contains the characteristic and image type data for the particular pixel being processed. A more detailed description of image segmentation and the associated circuits are set forth in U.S. patent application, Ser. No. 08/163,784, and U.S. Pat. No. 4,760,463, U.S. Pat. No. 4,780,709, U.S. Pat. No. 4,887,163, U.S. Pat. No. 4,897,803, U.S. Pat. No. 4,951,231, and U.S. Pat. No. 5,307,180. The entire contents of U.S. patent application, Ser. No. 08/163,784, and U.S. Pat. No. 4,760,463, U.S. Pat. No. 4,780,709, U.S. Pat. No. 4,887,163, U.S. Pat. No 4,897,803, U.S. Pat. No. 4,951,231, and U.S. Pat. No. 5,307,180 are hereby incorporated by reference.

The effect dataword is fed into a first decoder 13 corresponding to an image processing module 14. Image processing module 14 receives the temporarily stored image data from buffer 16. After receiving the temporarily stored image data, the first image processing module 14 performs the appropriate image processing operations in response to the decoding of the effect dataword by decoder 13. After completion of the operations, the effect dataword is passed on to a second decoder 11 and the (non)processed image data is passed on to a second image processing module 12. The second decoder and second image processing module operate in essentially the same manner as the first decoder and first image processing module; except, the image processing operations of the second image processing module 12 are different from that of the first image processing module 14. Thereafter, the effect dataword and (non)processed image data are propagated through a variety of decoders and associated image processing modules until all the appropriate image processing operations are being carried out. It is noted that an image processing module may be rendered nonoperational by its associated decoder as a result of the decoding of the effect dataword. In this situation, the image data passes through the image processing module without processing, thereby outputting nonprocessed image data.

After being (non)processed by the last image processing module, the (non)processed image data is fed into an error diffusion circuit 5. At the same time, the associated effect dataword is fed into an error diffusion decoder 7. The error diffusion circuit 5 includes a thresholding circuit and an error distribution circuit for distributing the error associated with the thresholding process.

Also associated with the error diffusion decoder 7 and error diffusion circuit 5 is a distribution coefficient memory 4. The distribution coefficient memory 4 stores various sets of weighting coefficients to be utilized in the error diffusion process. The actual set of weighting coefficients to be utilized by the error diffusion process is determined according to information received from the error diffusion decoder 7. More specifically, the set of weighting coefficients to be utilized in the error diffusion process is selected based upon the image type or image characteristic of the pixel being processed. In response to the information received from the error diffusion decoder 7, the distribution coefficient memory 4 loads the properly selected set of weighting coefficients into the error diffusion circuit 5 so that the proper error terms can be propagated to downstream pixels. Moreover, the error diffusion circuit 5 outputs image data which is capable of being rendered on an output device.

Figure 3:
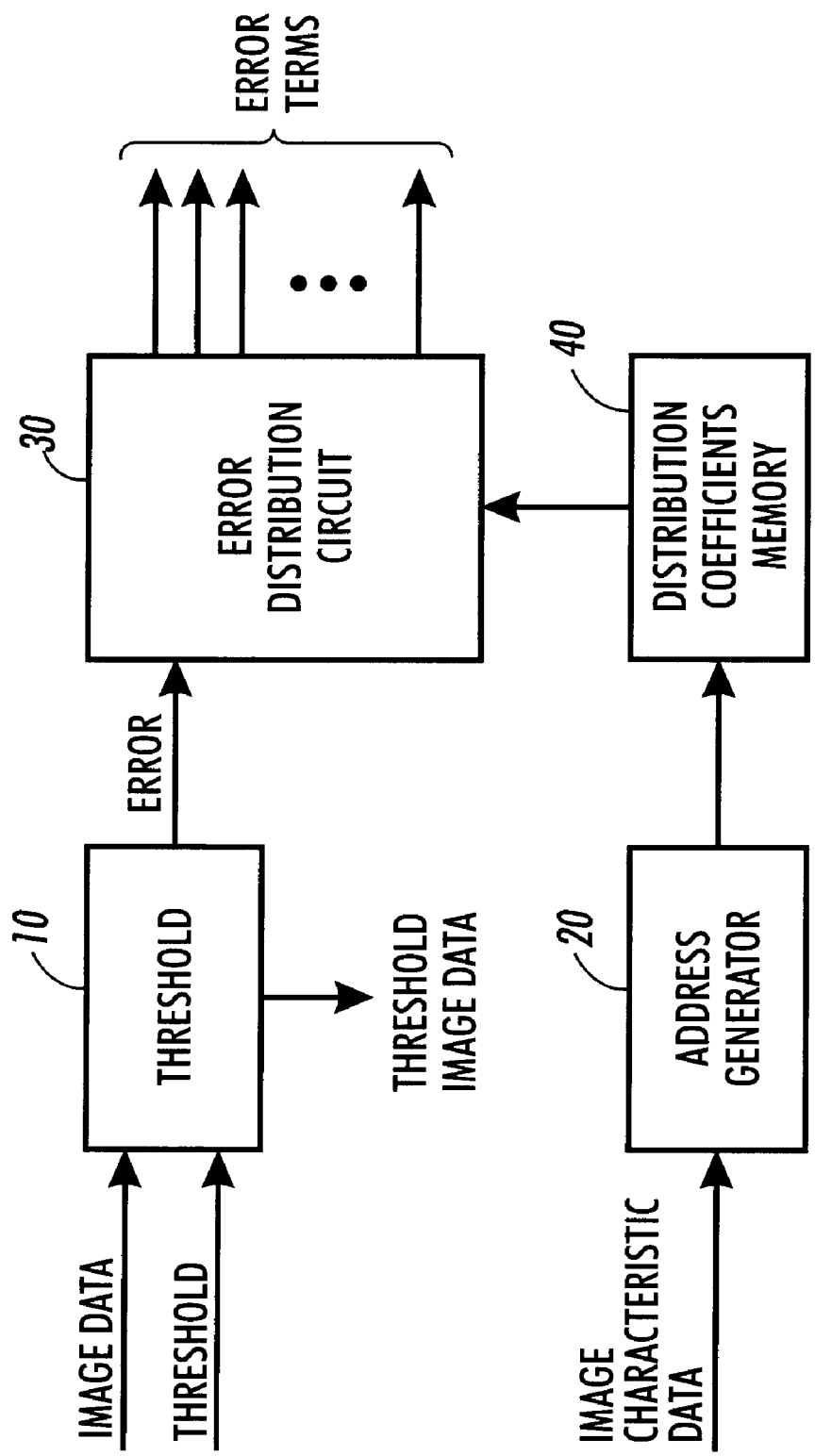
FIG. 3 shows a block diagram illustrating a dynamic error diffusion circuit for one embodiment of the present invention.

FIG. 3 illustrates a more detailed block diagram of the error distribution circuit 5 of FIG. 2. As illustrated in FIG. 3, a threshold circuit 10 receives (non)processed image data and a threshold value. As a result of the threshold process, the threshold circuit 10 outputs image data which is capable of being rendered by an output device and error data.

The error data is fed into an error distribution circuit 30 which distributes the error to downstream pixels according to a set of weighting coefficients. The actual set of weighting coefficients utilized by the error distribution circuit 30 is provided by a distribution coefficients memory 40. The distribution coefficient memory 40 stores various sets of weighting coefficients wherein each set of weighting coefficients is associated with a certain image type or image characteristic. The selection of the proper set of weighting coefficients is realized by receiving an address from address generator 20.

The address generator 20 generates an address for selecting the proper set of weighting coefficients in the distribution coefficient memory 40 based on received image characteristic data. Thus, if the pixel being processed has been labeled as a halftone image, one set of weighting coefficients are selected to be utilized in the error distribution circuit 30; whereas if the pixel being processed has been identified as continuous tone data, another set of weighting coefficients are provided to the error distribution circuit 30 for proper propagation of the error terms to downstream pixels.

Figure 4:
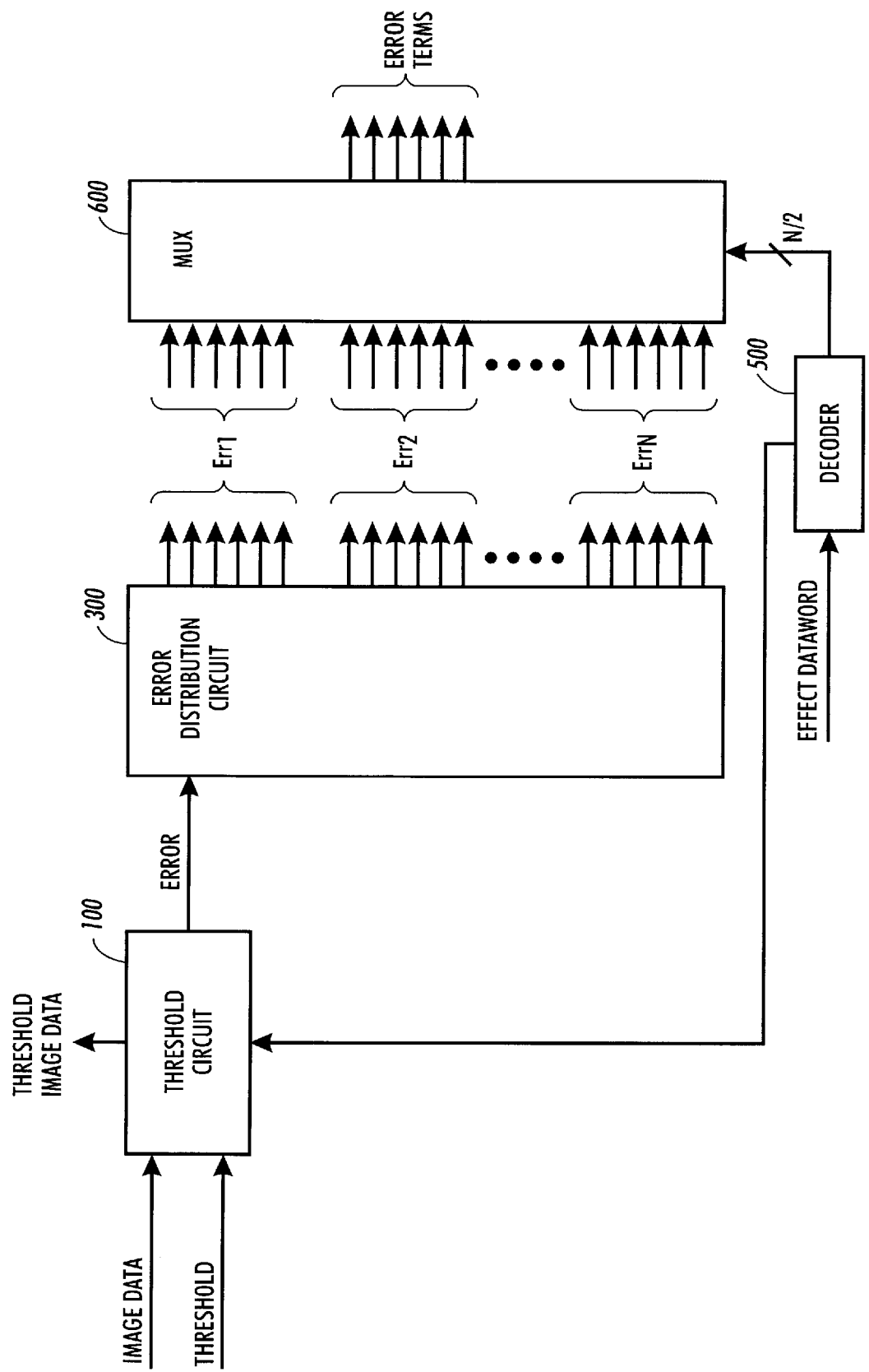
FIG. 4 shows a block diagram illustrating a dynamic error diffusion circuit for another embodiment of the present invention.

FIG. 4 illustrates another embodiment of the dynamic error diffusion process of the present invention. As illustrated in FIG. 4, a threshold circuit 100 receives image data and threshold data. As in FIG. 3, the threshold circuit 100 produces image data which is capable of being rendered by an output device and character data. The error data is fed into an error distribution circuit 300 which has pre-loaded therein all possible sets of weighting coefficients. Thus, the error distribution circuit 300 produces, in parallel, all possible sets of error terms that are to be propagated to downstream pixels. This is shown by the illustration of the sets of error terms $Err_1$, $Err_2$, ... $Err_n$. All the possible sets of error terms generated by the error distribution circuit are fed into a multiplexer 600 which selects the proper set of error terms to be propagated to downstream pixels.

The selection by the multiplexer of the proper set of error terms is governed by a decoder 500. Decoder 500 operates in essentially the same way as the error diffusion decoder 7 of FIG. 2 in that is receives the effect dataword and decodes the effect dataword to determine which set of error terms associated with a particular set of weighting coefficients are to be selected by the multiplexer to be propagated to downstream pixels.

An actual example of the utilization of the concepts of the present invention will be briefly described below in conjunction with FIGS. 5 and 6.

An image segmentation module (segmentation circuit 15 of FIG. 2) is utilized to detect the type of image being presently processed. As a result of the detection, an effect dataword or pointer tag is produced for the particular image pixel value. This effect dataword or pointer tag is utilized in the image processing system to activate or deactivate various image processing modules (14, 12, . . . 9 of FIG. 2). The effect dataword or pointer tag also includes information as to what individual image processes are to be performed by an activated image processing module.

After completing the image processing, the image data is binarized for rendering by an output device. This binarization process produces an error which is to be propagated downstream. As noted before, the propagation of the error depends on the weighting coefficients of the error diffusion process. In this example, there are a variety of possible sets of coefficients which are selected based upon the determination of the image type. If the image segmentation process determines that the pixel being processed is line text, the coefficients illustrated in FIG. 5 are chosen when error diffusion is performed. On the other hand, the set of coefficients illustrated in FIG. 6 are chosen when the decoding of the effect dataword or pointer tag informs the processing module that the pixel is continuous tone data.

Moreover, the selection of the weighting coefficients can be selected based merely on the image processing operations previously performed on the pixel. For example, if a high addressability error diffusion process is performed on the pixel, the weighting coefficients illustrated in FIG. 5 would be chosen in the preferred embodiment of the present invention. A full description of a high addressability error diffusion process is disclosed in copending U.S. patent application, U.S. patent application Ser. No. 08/285,326, filed concurrently herewith and will be discussed below.

There are many methods of rendering grey images on an output device. Moreover, error diffusion can render complex images that contain a mixture of text and picture reasonably well. This utilization of error diffusion eliminates the need to have image segmentation to separate the text from the picture so that the picture aspect of the document can be screened and the text aspect of the document can be threshold.

Figures 34, 35, 36:
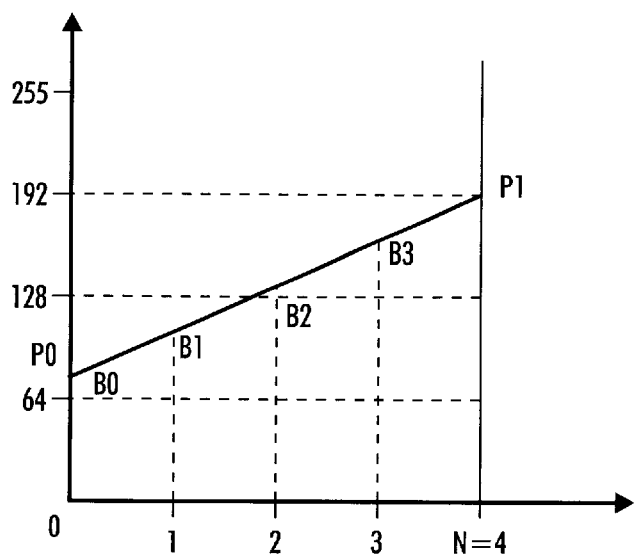
FIG. 34 shows a graphical representation illustrating the interpolation and binarization processes utilized in the present invention.
FIG. 35 shows a graphic representation illustrating a vertical line screen pattern.
FIG. 36 shows a graphical representation illustrating a diagonal line screen pattern.
Figure 37:
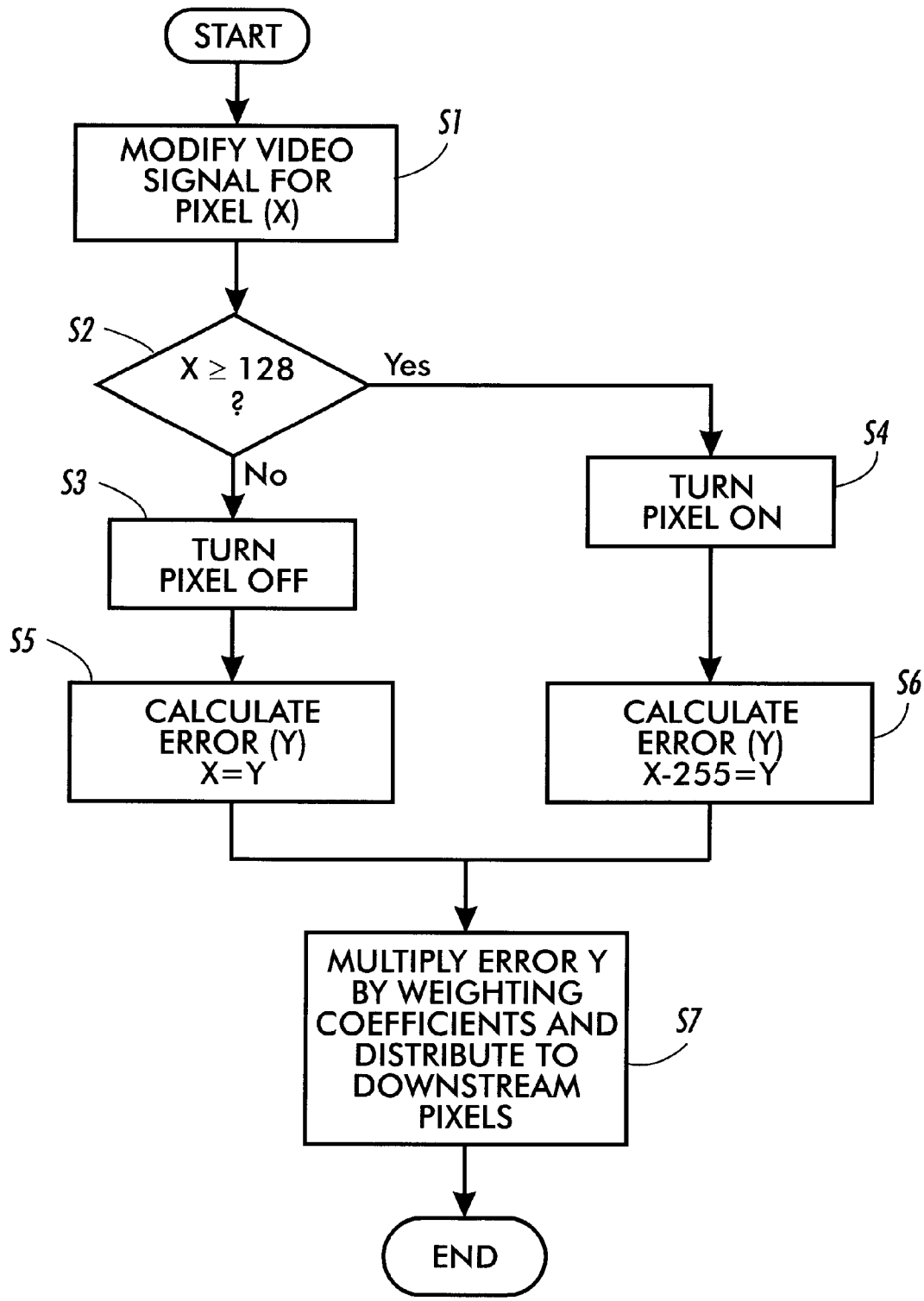
FIG. 37 shows a flowchart illustrating a typical error diffusion method.

FIG. 34 illustrates a typical error diffusion technique. In Step S1 of this process, the video signal for pixel X is modified to include the accumulated error diffused to this pixel from previous threshold processes. The modified video signal value (X) is compared at Step S2 with the value 128, assuming a video range between 0 and 255. If Step S2 determines that the modified video signal value (X) is greater than or equal to 128, the process proceeds to Step S4 wherein a value is output to indicate the turning ON of pixel X. The process then proceeds to calculate the error associated with the threshold process at Step S6 wherein this error, Y, is calculate as being X−255.

On the other hand, if Step S2 determines that the modified video signal value (X) is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream pixels in Step S7. Thus, the error from the threshold process is diffused to adjacent pixels. The coefficients conventionally used to diffuse the error to adjacent downstream pixels are illustrated in FIG. 35.

Figure 38:
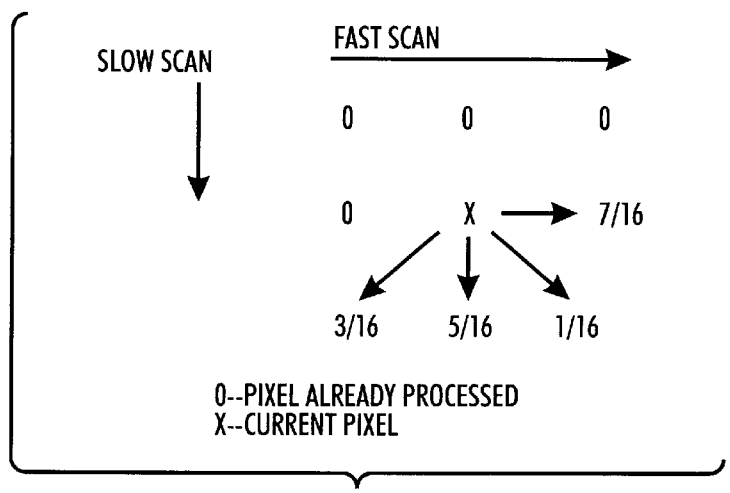
FIG. 38 shows a diagram illustrating a typical weighting coefficient scheme.

In FIG. 38, X represents the current pixel being thresholded. The weighted error from this threshold process is diffused to adjacent downstream pixels according to preselected coefficients. For example, the weighting coefficient for the next pixel in the same scanline conventionally is $7/16$, whereas the coefficient for the pixel that is one over in the fast scan direction and one down in the slow scan direction from the currently processed pixel is $1/16$.

This method provides good results, but with advances in marking or printing technology, a new error diffusion method is needed. More specifically, it has become possible to pulse width modulate a laser to print images with high addressability. To use error diffusion in combination with high addressability, one cannot simply perform the error diffusion at the high spatial resolution corresponding to the high addressability because the resulting subpixels would be too small for a typical print engine to render. Thus, it is desired to develop an error diffusion technique which can be effectively utilized with the present day highly addressable image output terminals without producing subpixels too small for rendering.

In describing the present invention, it is assumed that the video value in a range between 0 and 255. However, any chosen range for the video signal can be utilized in conjunction with the present invention. As described above, in conventional error diffusion methods, the printing of the pixels is determined by comparing a modified input with a threshold. The modified input video signal is the input video signal, V, plus an accumulated error term, $e_i$, determined from the processing of previous pixels. If the modified input video signal of the pixel is greater than or equal to the threshold, the output is a logical one and an error term of $V+e_i-255$ is propagated to the downstream pixels. If the modified input video signal is less than the threshold, the logical output is 0 and an error of $V+e_i$ is propagated downstream.

It is noted that the present invention is being described for a binary system. However, the concepts the present invention are readily applicable to four level systems, etc.

To extend the conventional error diffusion process to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

As noted above, the high addressability error diffusion process of the present invention produces two distinct outputs depending upon the interpolation scheme. With respect to a first interpolation scheme, the steps for determining the printing or rendering of a subpixel are as follows.

Figure 39:
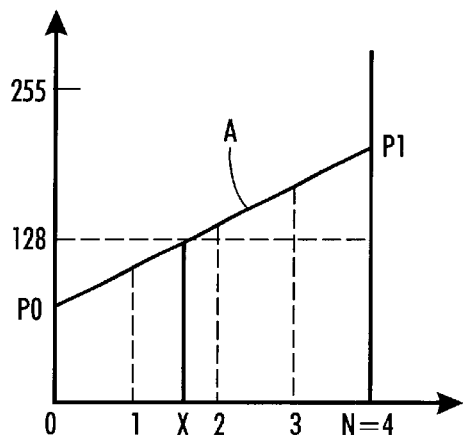
FIG. 39 shows a graph illustrating subpixel interpolation for one embodiment of the present invention.

Initially, the modified pixel values $P0_i=V_{i-1}+e_{i-1}=P1_{i-1}$ and $P1_i=V_i+e_i$ are computed at two locations corresponding to the input resolution. In this example, as illustrated in FIG. 39, the subpixels are denoted by 0 to N−1. In FIG. 39, the high addressability characteristic, N, is equal to 4.

As illustrated in FIG. 39, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized.) The intersection of the line connecting P0 and P1 and the line representing the threshold at 128 determines which subpixels are to be rendered or printed. The X coordinate of the point of intersection is determined and normalized to N by the equation X=N (128−P0)/(P1−P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 39, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

Figure 40:
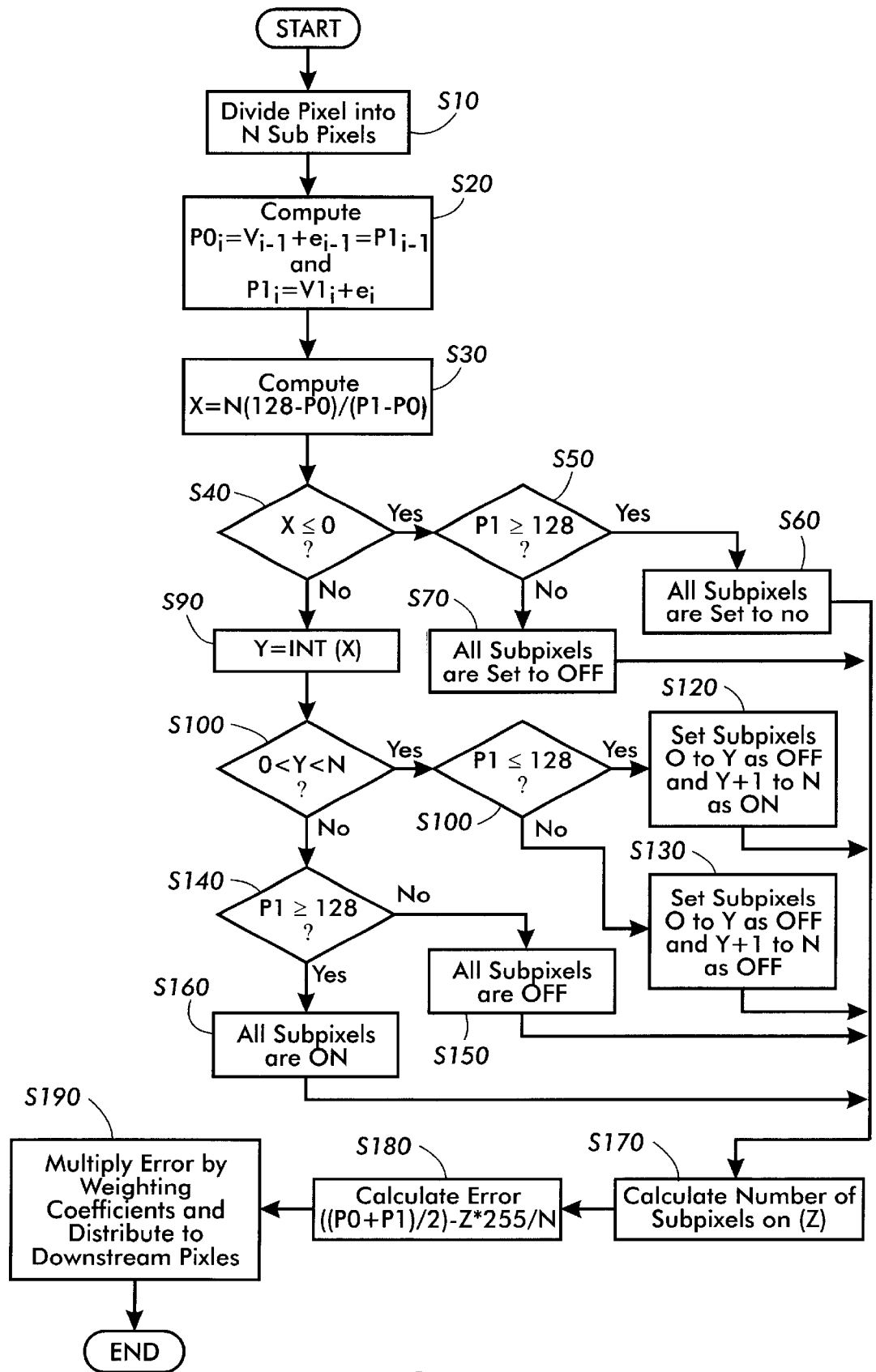
FIG. 40 shows a flowchart illustrating the error diffusion method using the interpolation schemes of FIG. 39.

FIG. 40 illustrates the actual method utilized to carry out the interpolation and error distribution process described above. In FIG. 40, at Step S10, the modified video input signal is divided into N subpixel values. At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S110 determines whether the value P1 is less than or equal to 128. If the value P1 is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

The second interpolation method with respect to implementing the high addressability error diffusion method of the present invention will be describe as follows.

Figure 41:
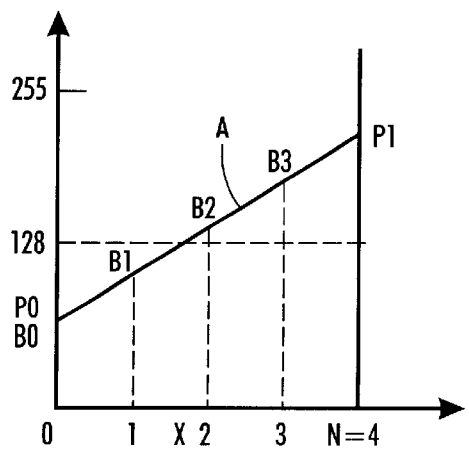
FIG. 41 shows a graph illustrating subpixel interpolation for a second embodiment of the present invention.

Initially, the modified pixel values $P0_i=V_i+e_i$ and $P1_i=V_{i+1}+e_i$ are computed. FIG. 41 illustrates the values P0 and P1 for the second version of the high addressability error diffusion method of the present invention. As in the first method, the subpixels are denoted by 0 to N−1 wherein, as in the previous case, the high addressability characteristic is N=4.

The interpolated subpixel values are computed as $B_n=P0+n(P1-P0)/N$ for n=0 to N−1. The interpolated subpixel values are then compared with a threshold value which in the preferred embodiment is 128, assuming that the video value ranges from 0 to 255.

If $B_n$ is greater than or equal to 128, the subpixel is turned ON; otherwise, the subpixel is turned OFF. In the second version, the error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

Figure 42:
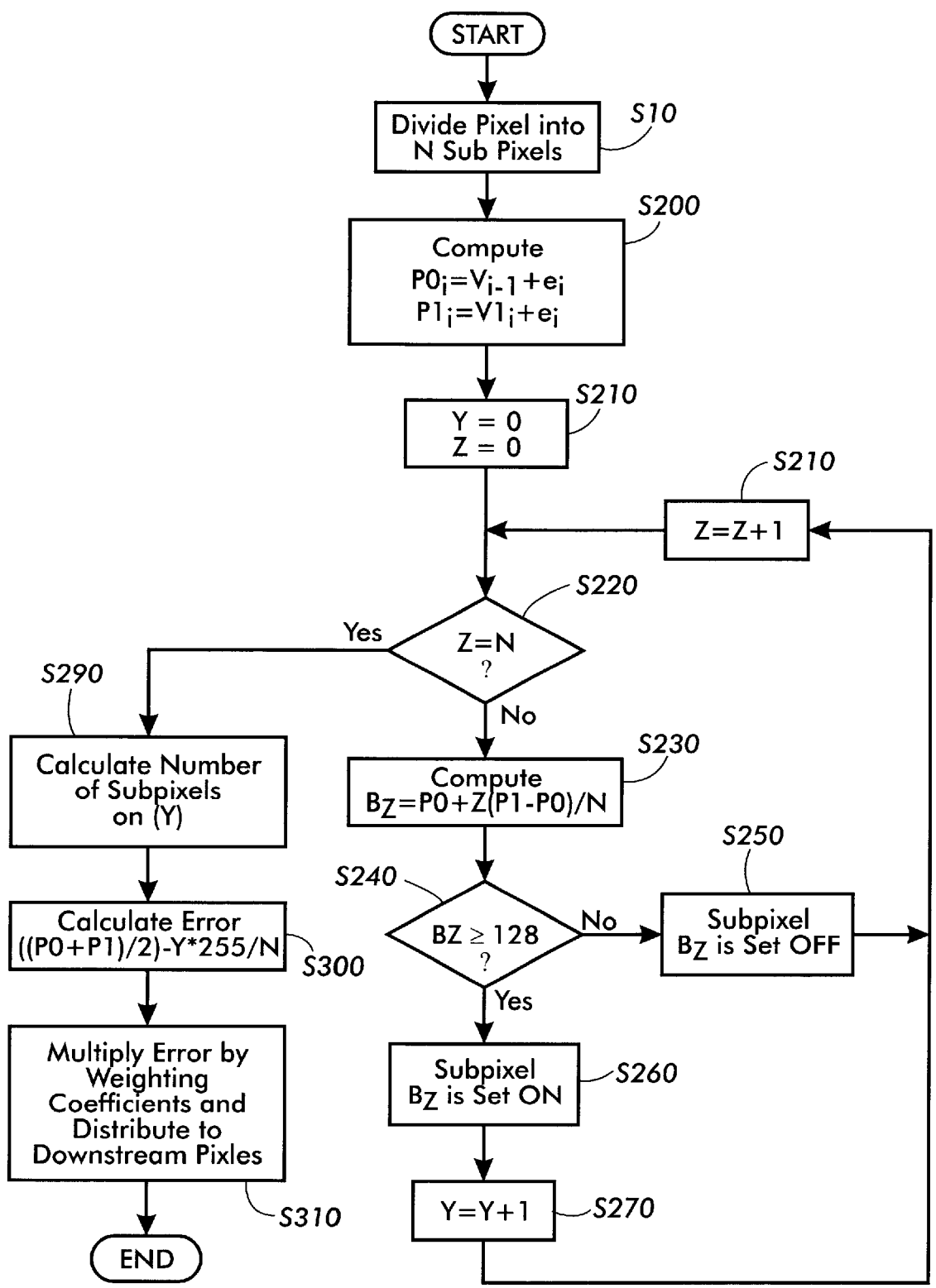
FIG. 42 shows a flow chart illustrating the error diffusion method of the present invention using the interpolation scheme of FIG. 41.

FIG. 42 illustrates the process utilized in the second interpolation version of the high addressability error diffusion method of the present invention. As in the FIG. 40, the inputted modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

Figure 43:
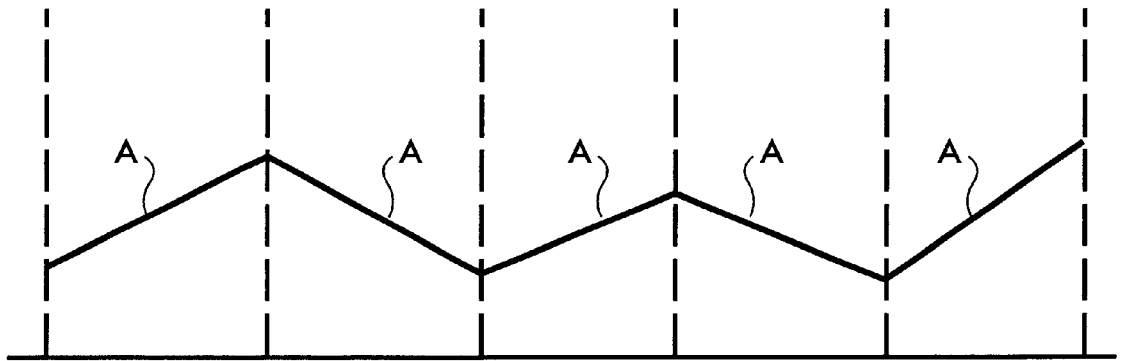
FIGS. 43 and 44 show graphs illustrating the subpixel relationships for the interpolation schemes of FIGS. 39 and 41.

FIG. 43 illustrates the high addressability relationship between adjacent pixels utilizing the first interpolation version of high addressability error diffusion method. More specifically, it is noted that the P1 value of the present pixel is utilized as the P0 value for the next pixel.

Figure 44:
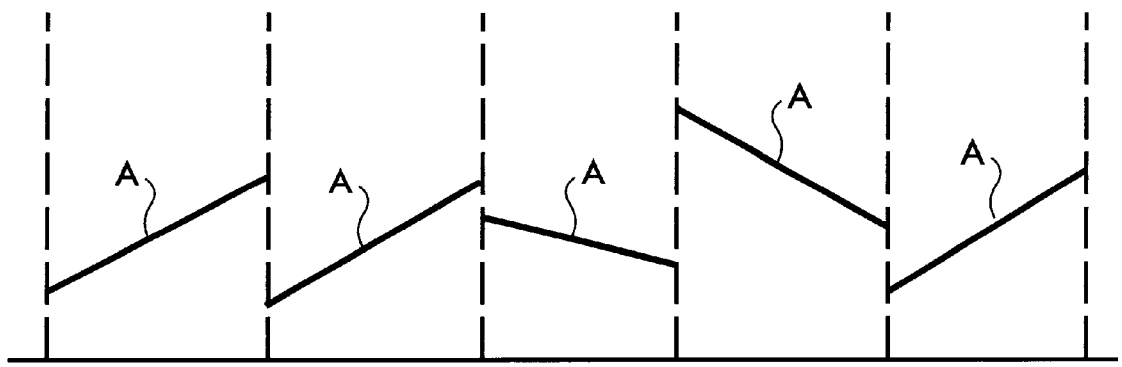

On the other hand, FIG. 44 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the high addressability error diffusion methods will be different.

In the circuit implementation, the input video signal is input into an error calculation circuit and a video modification circuit. An error component $e_{FIFO}$, is also fed into the error calculation circuit. The error calculation circuit calculates the various possible error values that can result from the presently occurring binarization process. The selection of the proper error to be output by the error calculation circuit is based upon a received error selection signal which will be discussed in more detail below.

The selected error value from the error calculation circuit is fed into a coefficient matrix circuit which distributes the error based upon a set of weighting coefficients. The coefficient matrix circuit splits the error values into the two components $e_{FIFO}$ and $e_{FB}$. The feedback error, $e_{FB}$, is output from the coefficient matrix circuit and fed back to the video modification circuit. The video modification circuit also receives $e_{FIFO}$ from a buffer.

The video modification circuit produces the interpolated subpixel values for the high addressability error diffusion method wherein the interpolated subpixel values are fed into the binarization circuit along with a threshold value. In the preferred embodiment of the present invention, the threshold value is 128. However, it is noted that this threshold value can be any value.

The binarization circuit binarizes the inputted video data so as to output binarized image data for utilization by an image rendering device. The binarization circuit also produces the error selection signal which is utilized by the error calculation circuit to choose the correct error value to be fed to the coefficient matrix circuit. This error selection signal represents the number of interpolated subpixels which are turned ON during the binarization process. Thus, the error calculation circuit may include a multiplexer to make this selection.

The error calculation circuit is in parallel with the video modification circuit and the binarization circuit. Thus, the high addressability error diffusion method can be readily implemented in hardware so that the image data can be binarized within the time constraints and throughput specifications of a high output image rendering device.

On the other hand, if a screening/high addressability error diffusion process is performed on the pixel, the weighting coefficients illustrated in FIG. 6 would be chosen in the preferred embodiment of the present invention. A full description of the screening/high addressability error diffusion process is disclosed in copending U.S. patent application, U.S. patent application Ser. No. 08/285,328, filed concurrently herewith and will be discussed below.

Image information, be it color or black and white, is commonly derived by scanning, initially at least, in a grey level format containing a large number of levels, e.g.: 256 levels for black and white and more than 16 million ($256^3$) levels for color. This multi-level format is usually unprintable by standard printers.

The term "grey level" is used to described such data for both black and white and color applications. Standard printers print in a limited number of levels, either a spot or a no spot in the binary case, or a limited number of levels associated with the spot, for example, four in the quaternary case. Since grey level image data may be represented by very large values, it is necessary to reduce grey level image data to a limited number of levels so that it is printable. Besides grey level image information derived by scanning, certain processing techniques, such as computer generation, produce grey level pixel values which require such a conversion.

One standard method of converting grey level pixel image data to binary level pixel image data is through the use of screening, dithering or halftoning. In such arrangements, over a given area, each grey level pixel within the area is compared to one of a set of preselected thresholds. The set of thresholds comprises a matrix of threshold values or a halftone cell.

Figure 31:
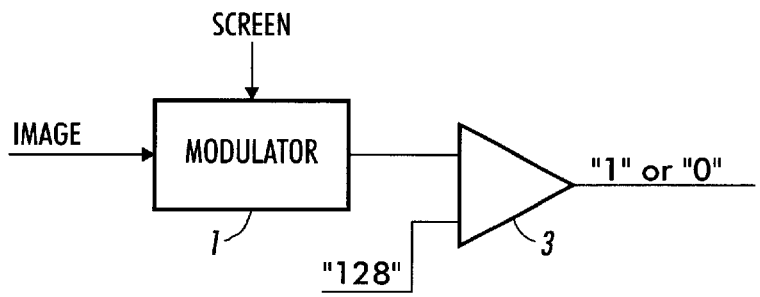
FIG. 31 shows a block diagram illustrating a typical screening circuit.

FIG. 31 illustrates a block diagram of a typical screening circuit. In this circuit, an unmodified image or video signal is fed into a modulation circuit 1 with a screen value from a halftone screen matrix to produce a modified signal. The modified signal is then thresholded by a binarization circuit 3 to produce a binary output. The binary output represents either the ON or OFF characteristic of the processed pixel.

In this process, the sampled image picture elements are compared with a single threshold, and a black/white decision is made. However, the threshold relationship is modified by modulating the image data with the screen data. The screen data is selected in sequential order from a two-dimensional matrix defined as a halftone cell threshold set. The set of screen values and the arrangement therein determine the grey scale range, frequency, angle, and other properties of the halftone pictorial image.

The effect of such an arrangement is that, for an area where the image is grey, some of the thresholds within the matrix will be exceeded, while others are not. In the binary case, the portions of the matrix, or cell elements, in which the thresholds are exceeded are printed as black, while the remaining elements are allowed to remain white or viceversa. The effect of the distribution of black and white over the cell is integrated by the human eye as grey.

However, typical screening presents problems in that the amount of grey within an original image is not maintained exactly over an area because the finite number of elements inside each halftone cell only allows the reproduction of a finite number of grey levels. The error arising from the difference between the threshold value and the actual grey level value at any particular cell is, typically, thrown away. This results in loss of image information and creates significant image artifacts, such as banding or false contours that can be seen in smooth image areas. In banding, the image input grey level varies smoothly over an area while the halftoned image has to make a transition from one halftone dot (grey level) to another. This transition can clearly be seen as a band or contour running through smooth image parts.

Another problem associated with screening grey images is the trade-off between the screen frequency and the number of grey levels available. Although it is desirable to use a high frequency screen, the number of grey levels available decreases as the screen frequency increases. One method which has been proposed to increase the number of grey levels as the screen frequency increases is set forth in U.S. Pat. No. 5,317,653 to Eschbach et al. The entire contents of U.S. Pat. No. 5,317,653 are hereby incorporated by reference.

In this method, the grey image is first reduced to a small number of grey levels with error diffusion, and then a line screen with a small number of grey levels and a high frequency is used. This two step process binarizes the image.

However, to implement such a method, a print engine or system requires a multi-level error diffusion process followed by screen thresholding. Typically, the image processing architecture for such machines do not have such a capability. Therefore, it is desirable to achieve the same results, but without departing from the typical image processing architecture of printing system.

Typically, the image processing architecture of a printing system uses either the functions of screening, thresholding, or error diffusion. For pixels to be thresholded, a modified video signal, $V_T'$, is computed from the pixel video signal V. The modified video signal, $V_T'$, is defined as $V_T'=(T+255-V)/2$. In this definition, T is the desired threshold level. It is noted that for T and V between 0 and 255, the computed V' will also be in the range of 0 to 255.

For pixels to be screened, a similar modified video signal, $V_S'$, is computed from the pixel video signal V and the screen value S at the pixel location. The modified video signal, $V_S'$, for a screening process is defined as $V_S'=(S+255-V)/2$. The screen value S depends on the pixel location as well as the halftone screening pattern being used. It is noted that either a line screen or a dot screen can be used.

For pixels to be rendered by error diffusion, the modified video signal is simply the video signal inverted. More specifically, the modified video signal is defined as $V_{ED}'=255-V$.

In the final step of binarization, all the modified video signals; $V_T'$, $V_S'$, and $V_{ED}'$; are compared with 128 to determine the ON or OFF characteristics of the pixel. Namely, if the modified video signal is greater than or equal to 128, the pixel should be OFF (black), otherwise it should be ON (white). It is noted that this gives the same result as the more typical approach of comparing the video V itself with the threshold T or the screen values S. In the case of error diffusion, the appropriate error propagated from the previous pixels must be added to V' before comparing with 128 and the error to be propagated to downstream pixels must also be computed afterwards.

However, as noted above, it is desirable to screen the video signal at a higher frequency while maintaining the available number of grey levels. To realize this result, the present invention utilizes a screening process prior to an error diffusion process. More specifically, the modified video signal $V_S'$ is first computed utilizing the screening method disclosed above. This computation uses screen values from a small one-dimensional screen cell. After computing the modified video signal $V_S'$, the screened modulated video signal V' is processed by an error diffusion process. In the preferred embodiment of the present invention, this error diffusion process is a high addressability error diffusion process.

Figure 32:
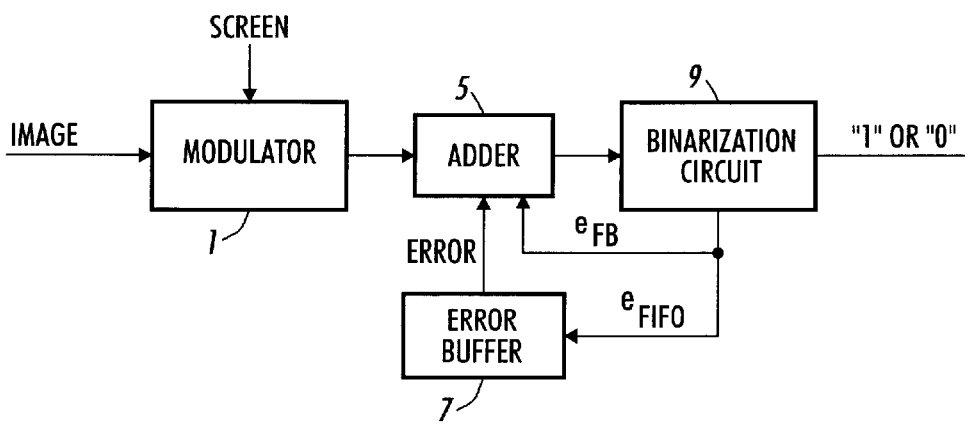
FIG. 32 shows a block diagram illustrating the binarization process of the present invention.

FIG. 32 illustrates a circuit which performs the screening/error diffusion process of the present invention. In FIG. 32, an unmodified video or image signal is screened in modulator 1 to produce a modified signal $V_S'$ using the preferred equation of $V_S'=(S+255-V)/2$ wherein S is equal to screen values derived from a halftone screen pattern.

This modified signal $V_S'$ is fed into adder 5 where the signal is further modified by the addition of an error value propagated from upstream processed pixel locations to produce $V_S''$ ($V_S''=V_S'+e_i$). The error component ($e_{FIFO}+e_{FB}$) utilized by adder 5 is received from error buffer 7 ($e_{FIFO}$) which stores the propagated error and binarization circuit 9 ($e_{FB}$).

The further modified signal $V_S''$ is fed into binarization circuit 9 which converts the multi-level modified signal $V_S''$ to a binary output by utilizing an error diffusion/threshold process. Some of the error ($e_{FB}$) from this process is fed back directly to the next processed pixel, while the rest ($e_{FIFO}$) is stored in the error buffer 7 for processing of pixels on the next scanline. The apportionment of the error is based on weighting coefficients. Any set of coefficients can be used. In the preferred embodiment of the present invention, the weighting coefficients are the coefficients described in copending U.S. patent application Ser. No. 08/167,758 to Shiau et al.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible.

As noted above, in the preferred embodiment, the error diffusion process is a high addressability error diffusion process; therefore, The screening/high addressability error diffusion process will be explained in more detail below. Initially, the high addressability error diffusion process will be briefly described.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Initially, the modified pixel values $P0_i=V_i+e_i$ and $P1_i=V_{i+1}e_i$ are computed. The subpixels are denoted by 0 to N−1 wherein the high addressability characteristic is N=4. The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255.

If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

More specifically, the inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

It is noted that when performing the high addressability error diffusion process on the screen modulated video signal, $V_S'$, the black and white levels assumed in a typical error diffusion process need to be modified. The actual modifications are as follows.

Figure 33:
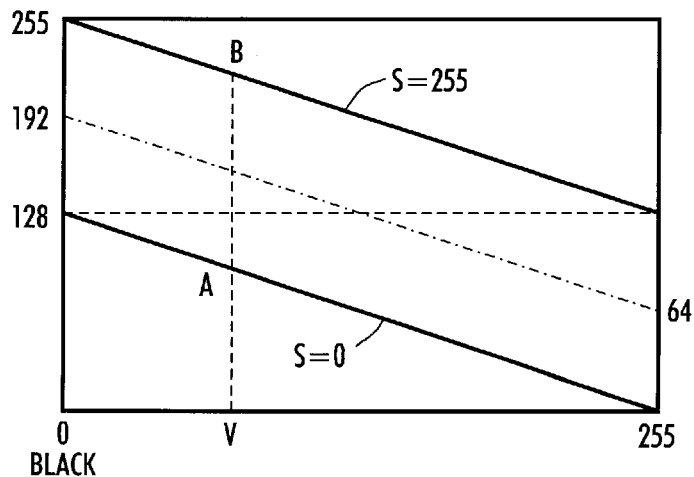
FIG. 33 shows a graphic representation of the screening process carried out by the present invention.

The conversion from the pixel video signal V to the screen modulated signal $V_S'$ is depicted in FIG. 33. For a fixed video signal V, the screen modulated video signal $V_S'$ has values varying between the levels A and B as the screen value S vary between 0 and 255. Thus, the effective white and black values to be used in the error diffusion process or calculation should be, in this example, for the value of white, 64 and, for the value of black, 192. This is different from the typical error diffusion values, where the white value would be V'=0 and the black value would be V'=255.

The high addressability error diffusion process used in conjunction with the screening process will be further explained in conjunction with FIG. 34. In this explanation, the value $e_i$ represents the rendering error propagated to the present i-th pixel from the previous pixels. At the i-th pixel location, the subpixel values are given by $P0=V_S'{}_i+e_i=V_S''{}_i$ and $P1=V_S'{}_{i+1}+e_{i=VS}''{}_{i+1}$. The values are used to obtain the interpolated values $B_0$ to $B_{N-1}$, as shown in FIG. 34. It is noted that the high addressability factor illustrated in FIG. 34 is N=4.

These interpolated values are then compared with 128 to determine the ON or OFF characteristics of the subpixels. If the number of subpixels rendered as black is indicated by n, the current rendering error is given by the desired output minus the actual output, $e'_i=((P0+P1)/2)-64-(n(192-64)/N)$. In other words, the actual output is defined as the desired output, (P0+P1)/2−64, minus the product of the number of ON subpixels and the difference between the black and white reference values divided by the high addressability characteristic. This new error is then multiplied by a set of weighting coefficients and the weighted errors are propagated to the downstream pixels. To determine the ON or OFF characteristics, the subpixel values are processed by a number of comparison steps.

To determine the ON or OFF characteristics, the subpixel values are processed by a number of comparison steps. An example of the actual architecture of the circuitry used to implement the high addressabilty error diffusion process is fully disclosed in copending U.S. patent application, application Ser. No. 08/285,572 filed concurrently herewith and will be discussed below.

Error diffusion is a well known method of processing grey scale images on a binary output device. One of the key ingredients in error diffusion is a requirement to propagate or diffuse the error which is generated by reducing (binarizing) the grey level value of a grey scale image.

Recently, improved features have been added to the typical error diffusion method. Specifically, it has been proposed to utilize high addressability error diffusion. A brief description of high addressability error diffusion will follow.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at a resolution lower than the addressability resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Figure 10:
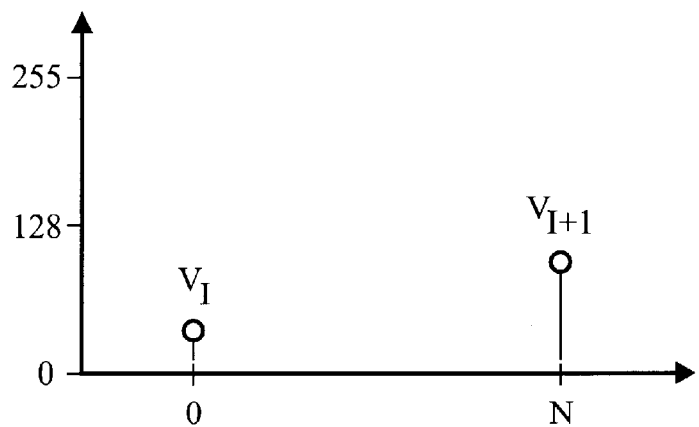
FIG. 10 shows a graphical representation of obtaining boundary subpixel values.

FIGS. 12–18 illustrate the computational steps required to perform high addressability error diffusion using a particular interpolation scheme. Initially, as illustrated in FIG. 10, the pixel value $V_i$ and $V_{i+1}$ are obtained. The actual pixel values are graphically illustrated in FIG. 10, wherein the pixel value $V_i$ represents the pixel value at the subpixel position 0 and the pixel value $V_{i+1}$ represents the pixel value at the N−1 subpixel. In FIG. 10, the pixel values range from 0 to 255 utilizing a conventional eight bit dataword to represent the multi-level grey value of the image data to be process. It is noted that any range can be utilized to represent the grey level value of the image data; for example, 0 to 511, 0 to 127, etc.

Figure 11:
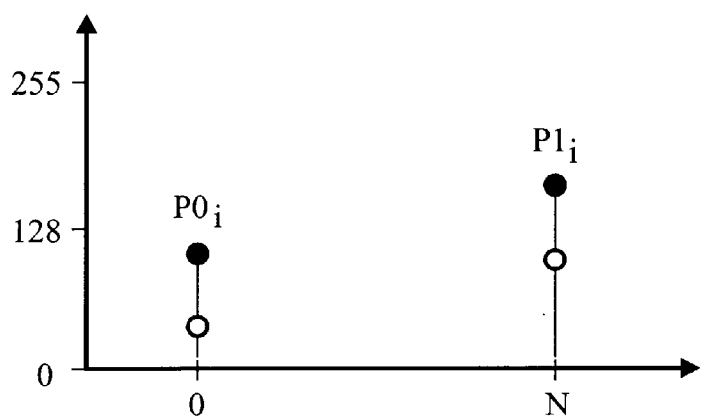
FIG. 11 shows a graphical representation of modifying the obtained boundary subpixel values with an error component.

After obtaining the initial pixel values of $V_i$ and $V_{i+1}$, a diffused error component $e_i$ (the accumulated error from previous pixel binarization processes) is added to the pixel values $V_i$ and $V_{i+1}$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 11.

Figure 12:
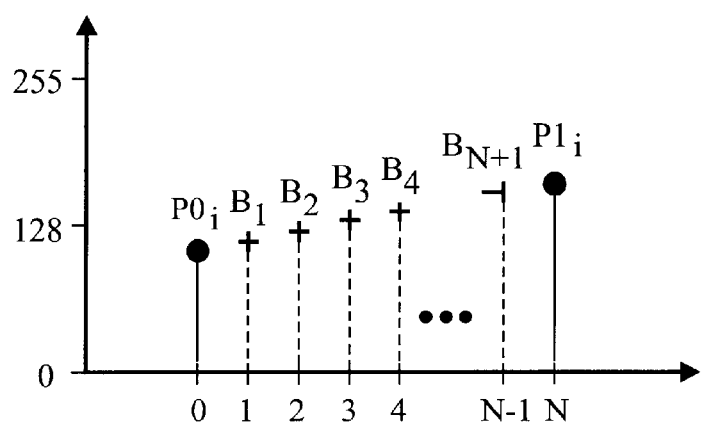
FIG. 12 shows a graphical representation of interpolating subpixel values between the modified boundary subpixel values.

After adding the diffused error component, the interpolated subpixel values are computed, as illustrated in FIG. 12. For example, the interpolated subpixel values are $B_n=P0_i+n(P1_i-P0_i)/N$ for n=0 to N−1, where N is the selected high addressability characteristic. It is noted that the value $P0_i$ is equal to $V_i+e_i$ and $P1_i$ is equal to $V_{i+1}+e_i$.

After computing the interpolated subpixel values, each interpolated subpixel value is compared to a threshold level.

Figure 13:
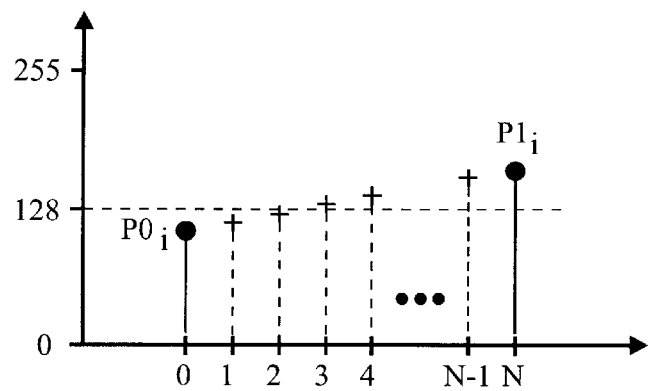
FIG. 13 shows a graphical representation of comparing the interpolated subpixel values with a threshold value.
Figure 14:
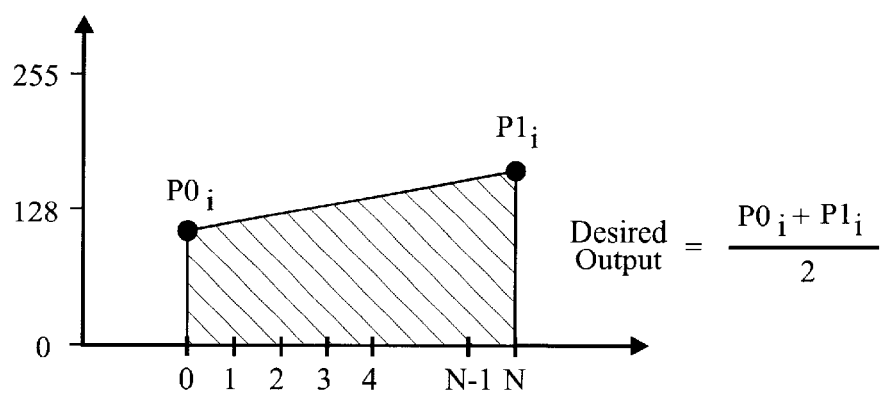
FIG. 14 shows a graphical representation of computing a desired output value.

In the example illustrated in FIG. 13, the threshold value is 128. It is noted that this threshold value can be any value within the range of the image data depending upon the desired results. In this example, each subpixel which has a value greater than or equal to 128 is set ON.

Figure 15:
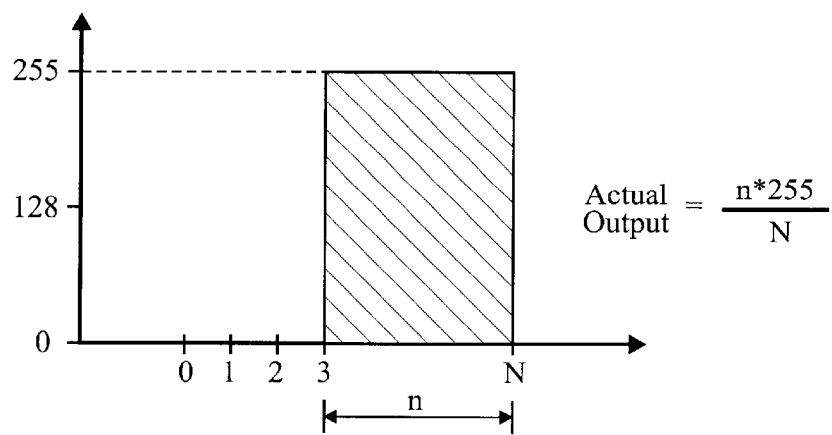
FIG. 15 shows a graphical representation of computing an actual output value.

Next, the desired output $(P0_i+P1_i)/2$ is computed. This computing of the desired output is graphically illustrated in FIG. 14. After computing the desired output, the actual output is computed. In this example, the actual output is equal to n*255/N where n is the number of subpixels that have been turned ON as the result of the comparison illustrated in FIG. 13. A graphical representation of the computed actual output is shown in FIG. 15.

Once the desired output and the actual output have been computed, the error diffusion method computes the error to be propagated downstream. This error is computed as the desired output minus the actual output. A graphical representation of this computation is shown in FIG. 16.

Figure 16:
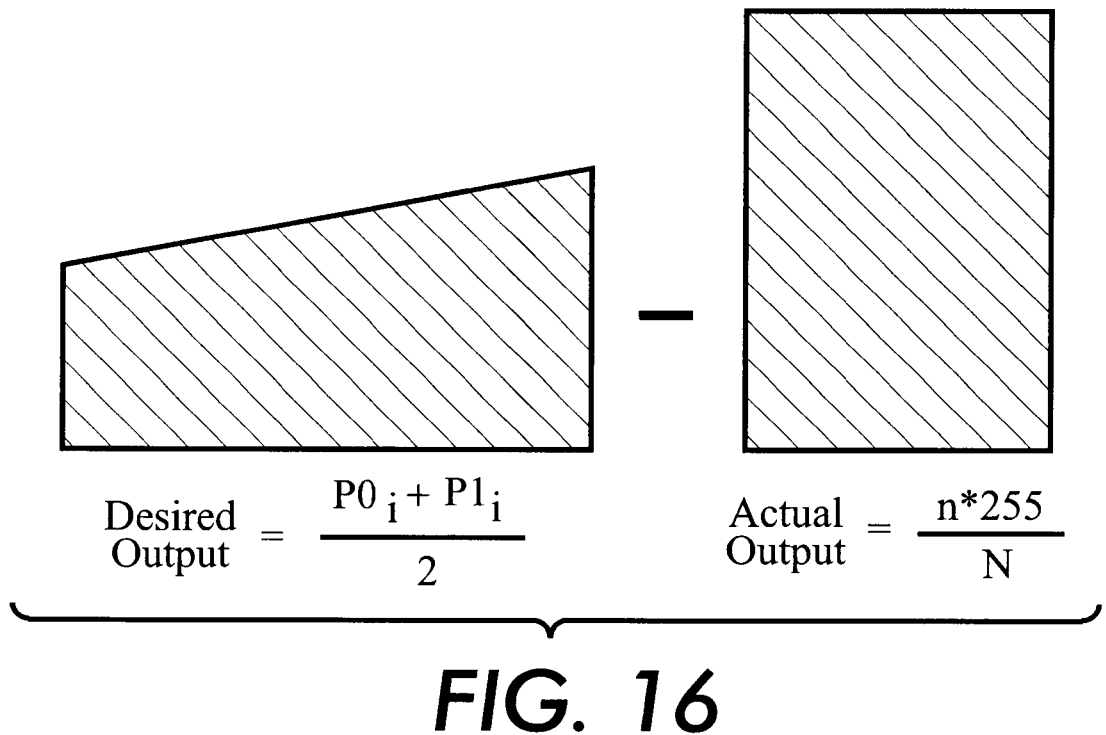
FIG. 16 shows a graphical representation of computing an error value to be propagated to downstream pixels.
Figure 17:
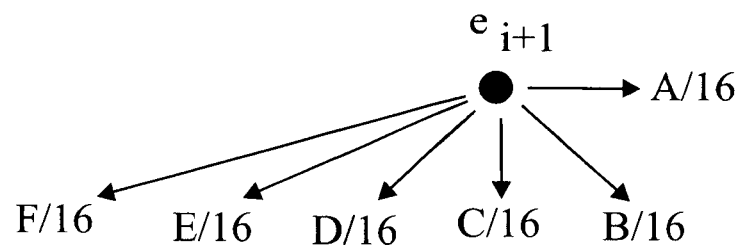
FIG. 17 shows a graphical representation illustrating actual distribution of the error in a typical error distribution routine.

As illustrated in FIG. 16, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 17. In this example, the distribution of error utilizes a set of error diffusion coefficients which allow fast processing by simple bit shifting. FIG. 17 illustrates the coefficients associated with each pixel location. An example of the exact coefficients are discussed in U.S. patent application, Ser. No. 08/167,758. The entire contents of Ser. No. 08/167,758 are hereby incorporated by reference.

Although the above enhancement significantly improves the print quality of the images rendered via error diffusion, this improvement tends to make the computations more complex in terms of hardware design and time consuming. One of the most important drawbacks of this high addressability error diffusion improvement has been the time needed to make the complex computations. Although the computations can be implemented in a software environment, the time needed to produce binarized image data for rendering is too long to readily implement such a solution in mid-speed to high-speed printing or image rendering devices. More specifically, the exact correspondence between the high addressability error diffusion computations in software to that which is implemented in hardware is different due to the speed requirements imposed by a system's throughput specification. Therefore, it is desirable to design an unique hardware implementation of the high addressability error diffusion method to meet the time constraints of the present day image rendering devices.

As discussed above, the hardware implementation of the high addressability error diffusion must meet the time restraints of the throughput specifications of the image rendering device utilizing the high addressability error diffusion method. More specifically, to be implemented in present day image rendering devices, the error computation must be completed in one clock cycle, since half of the error is diffused to the next pixel in the fast scan direction. The error which is diffused downward in the slow scan direction is summed and stored in a buffer. This portion of the error is part of the distributed error component required for binarizing pixels on the next scanline. This summing, however, can be performed several cycles later, since this error component is not needed until the following scanline.

If there were no constraints set on the time allowed to process the subpixel and the corresponding error or if present day microprocessors were fast enough to meet the time constraints of present day imaging devices, the hardware required to achieve high addressability error diffusion would be fairly straight forward. In this situation, the number of subpixels to be set ON could be determined by simply calculating the intersection of the line containing the points $P0_i$ and $P1_i$ and 128. The error to be distributed downstream would then be calculated based upon the number of subpixels which are turned ON. A block diagram of this hardware implementation is illustrated in FIG. 18.

Figure 18:
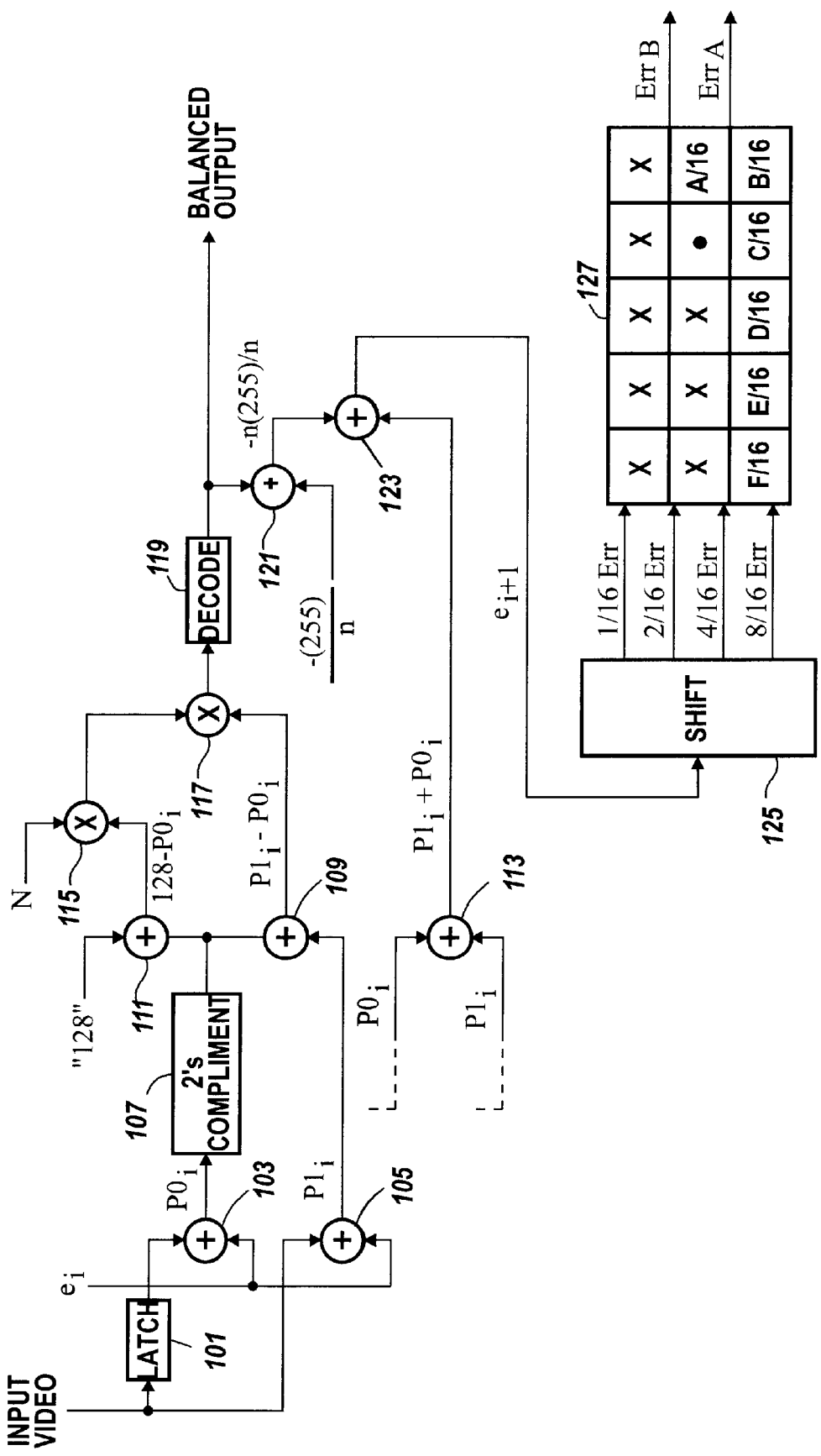
FIG. 18 shows a block diagram illustrating one embodiment of the present invention implementing a high addressability error diffusion process.

In FIG. 18, the input video signal is split and latched in latch 101 so as to produce the pixel value $V0_i$ and $V1_i$. $V0_i$ represents the latched input video signal $V1_i$, in other words, $V0_i$ represents the pixel value just proceeding the pixel value $V1_i$ in the same same scanline. The pixel value $V0_i$ is fed into an adder 103 with the error component $e_i$. Moreover, the error component $e_i$ is fed into an adder 105 along with the input video signal $V1_i$. The adder 103 produces an output signal $P0_i$ which is fed into a 2-complements circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128P0_i)$ can be multiplied by the high addressability characteristic value N. The resulting product is then divided by the sum from adder 109 by a divider circuit 117. The resulting quotient is represented by n and fed into a decoder 119. The actual function of decoder 119 is graphically illustrated in FIG. 19.

Figure 19:
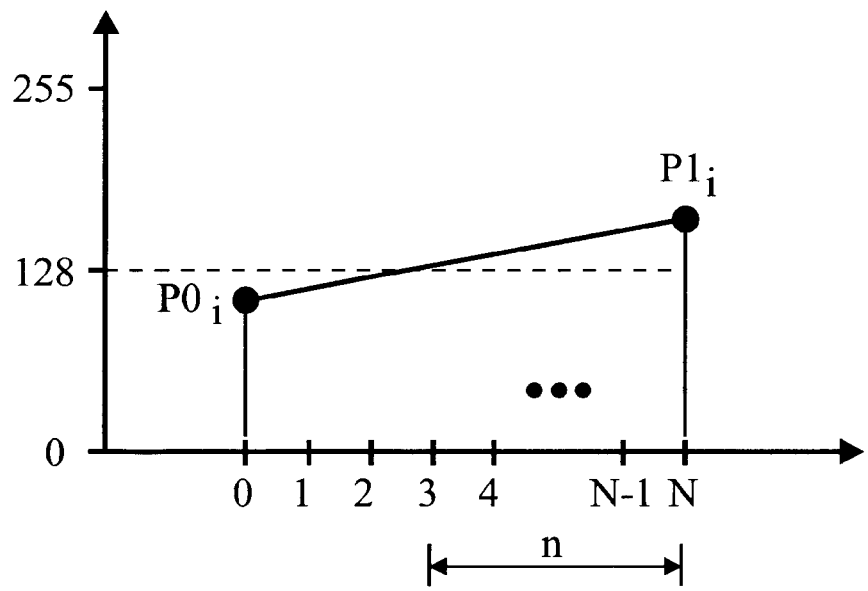
FIG. 19 shows a graphical representation illustrating a decoding process illustrated in FIG. 18.

More specifically, the decoder 119, as illustrated in FIG. 19, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value (-255/N). The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

Again, this hardware implementation of the high addressability error diffusion assumes that there are no time constraints, that there are no system's throughput specification requiring clock cycles exceeding 50 megahertz, or that the system has a microprocessor capable of operating at an instruction per second rate greater than 100 mips (million instructions per second). However, as noted above, typical image rendering devices have clock cycles which exceed 50 megahertz and require all image processing of a single pixel to be completed within approximately 20 nanoseconds of time to operate in realtime; i.e., within the throughput specifications of mid-volume to high volume printing systems.

To meet the time constraints imposed by present day rendering devices, the present invention decomposes the computation of the high addressability error diffusion method into two categories. The first category includes all computations which can be performed on the interpolated video signal including all possible subpixel error calculations outside or prior to entering a feedback path, and the second category is calculations which include the remaining computations that must be performed within one clock cycle (i.e., inside the feedback path). To realize this decomposition, the diffused error value is broken into two components, one component being the sum error which is stored and readily available in the FIFO buffer, namely $e_{FIFO}$, and the other is the fast scan feedback error component, $e_{FB}$, passed from binarizing of the neighbor pixel immediately preceding the pixel being processed in the fast scan direction.

With respect to these two categories, FIGS. 20–23 represent the computations which can be performed prior to entering the feedback loop, while FIGS. 24–28 are the computations which are performed within one clock cycle or within the feedback loop. Moreover, it is noted that some of these computations are performed in parallel. The parallel computations will be discussed with respect to FIGS. 20–28.

Figure 20:
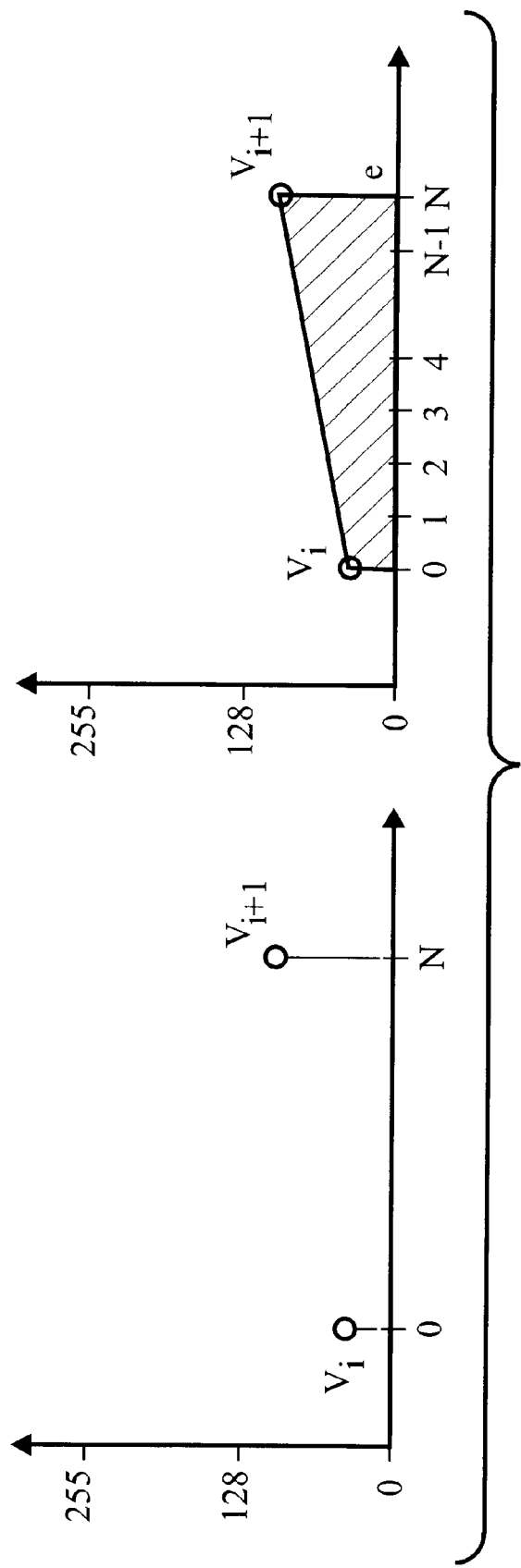
FIG. 20 shows a graphical representation of the preferred embodiment of the present invention illustrating the obtaining boundary subpixel values in parallel with the computing a desired output value.
Figure 21:
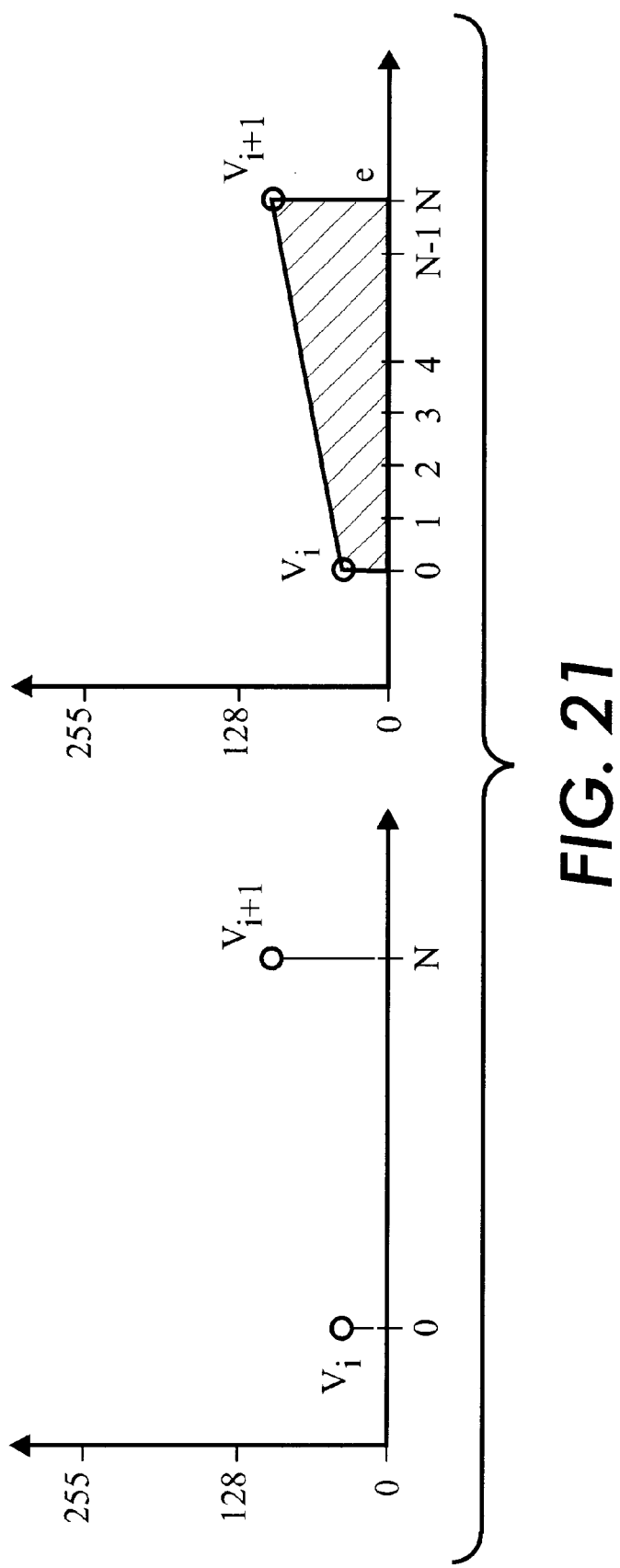
FIG. 21 shows a graphical representation of the preferred embodiment of the present invention illustrating of interpolating subpixel values between the obtained boundary subpixel values in parallel with the modifying of the desired output value with an error component.
Figure 23:
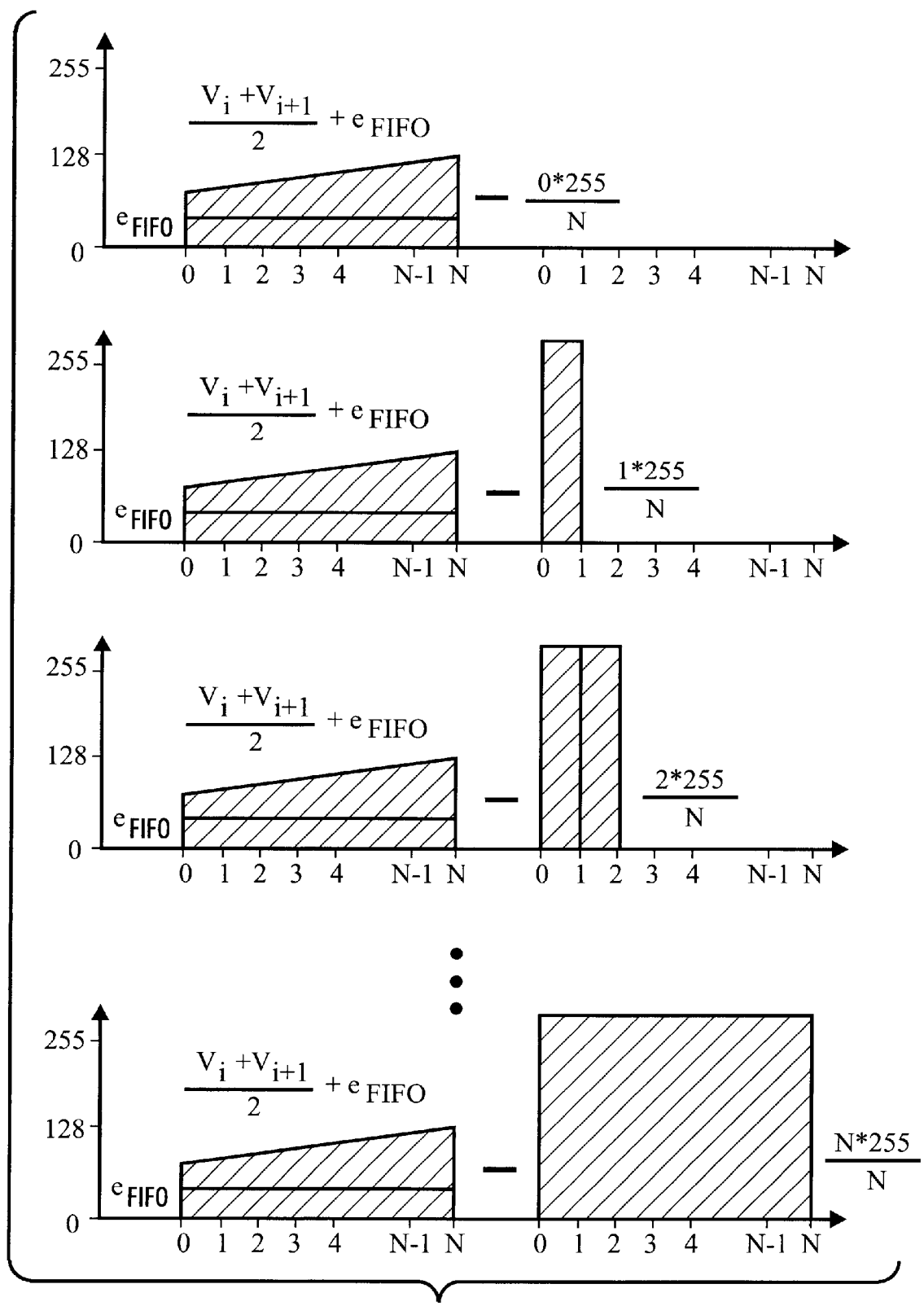
FIG. 23 shows a graphical representation of the preferred embodiment of the present invention illustrating the calculation of a plurality of partial possible error values.

FIG. 20 illustrates two such parallel computations which are carried out in the present invention. More specifically, FIG. 20 illustrates that the pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

After these parallel computations are completed, the preferred embodiment of the present invention computes the interpolated subpixel values in the same way as illustrated in FIG. 12. However, in parallel with this computation of the interpolated subpixel values, the desired output is continued to be computed by adding the error component $e_{FIFO}$. This, is graphically represented in FIG. 21.

Figure 22:
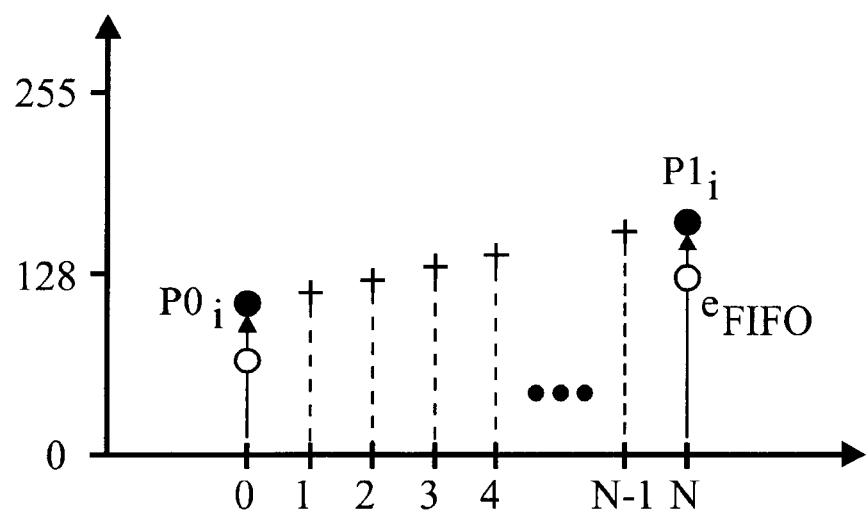
FIG. 22 shows a graphical representation of the preferred embodiment of the present invention illustrating of modifying the subpixel values between the obtained boundary subpixel values with an error component.

Next, the error component $e_{FIFO}$ is added to the pixel values $V_i$, and $V_{i+1}$ and the interpolated subpixels as illustrated in FIG. 22. At the same time (in parallel thereto), all possible actual subpixel outputs are subtracted from the desired output without including the diffused error component $e_{FB}$. In other words, N possible actual subpixel outputs are subtracted from the desired output computed in FIG. 21 to produce N possible error outputs $e_p$ (the desired output minus the actual output is equal to the error $e_p$). The computations illustrated in FIG. 22 are carried out in parallel with the computations illustrated in FIG. 23. It is further noted that the computations illustrated in FIGS. 20–23 are implemented outside the feedback loop.

Figure 24:
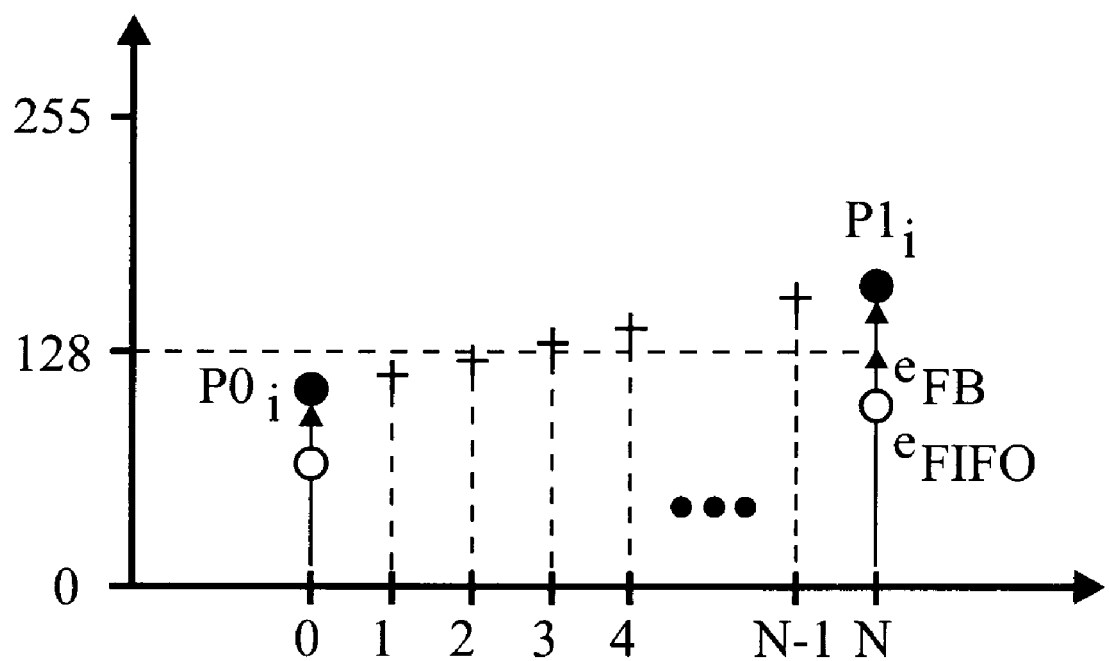
FIG. 24 shows a graphical representation of further modifying the modified subpixel values of FIG. 14 with another error component.
Figure 25:
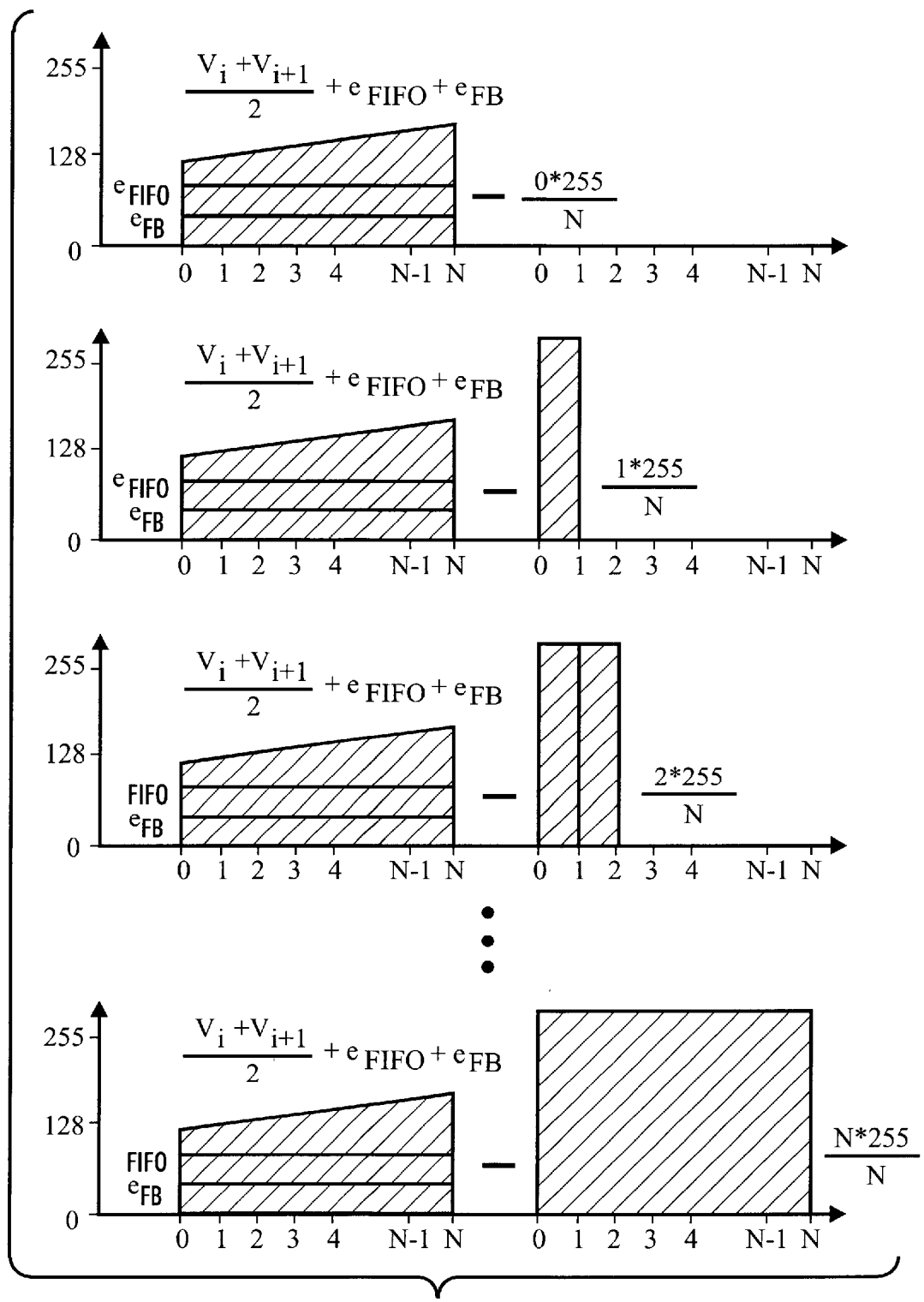
FIG. 25 shows a graphical representation of the preferred embodiment of the present invention illustrating the calculation of a plurality of complete possible error values.

Within the feedback loop, the computations are illustrated by FIGS. 24–28. Initially, within the feedback path, the error component $e_{FB}$ is added to the pixel values $V_i$, $V_{i+1}$, and the various interpolated subpixel values as illustrated in FIG. 24. At the same time that the feedback error component $e_{FB}$ is being added in FIG. 24, the error component $e_{FB}$ is added to all possible subpixel desired outputs as illustrated in FIG. 25. In other words, the error component $e_{FB}$ is individually added to all N error results ($e_p$) stemming from the calculations illustrated by FIG. 23.

Figure 26:
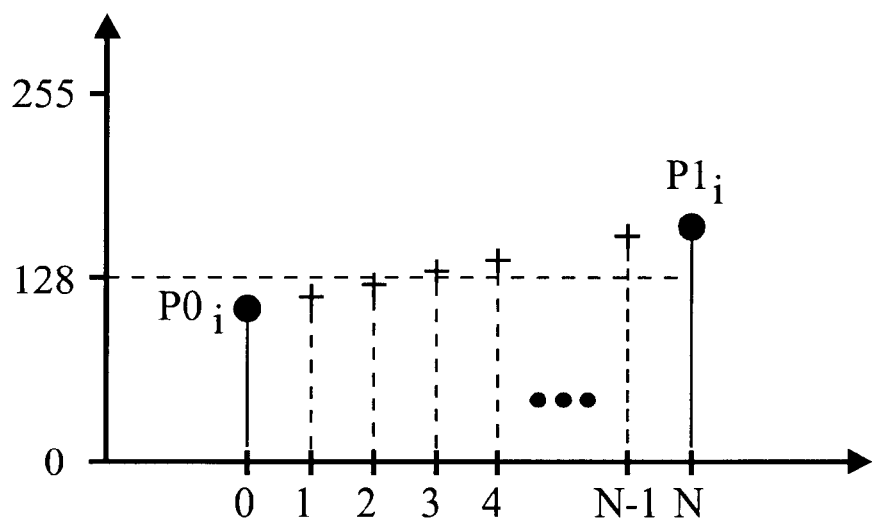
FIG. 26 shows a graphical representation of thresholding the further modified subpixel values.
Figure 27:
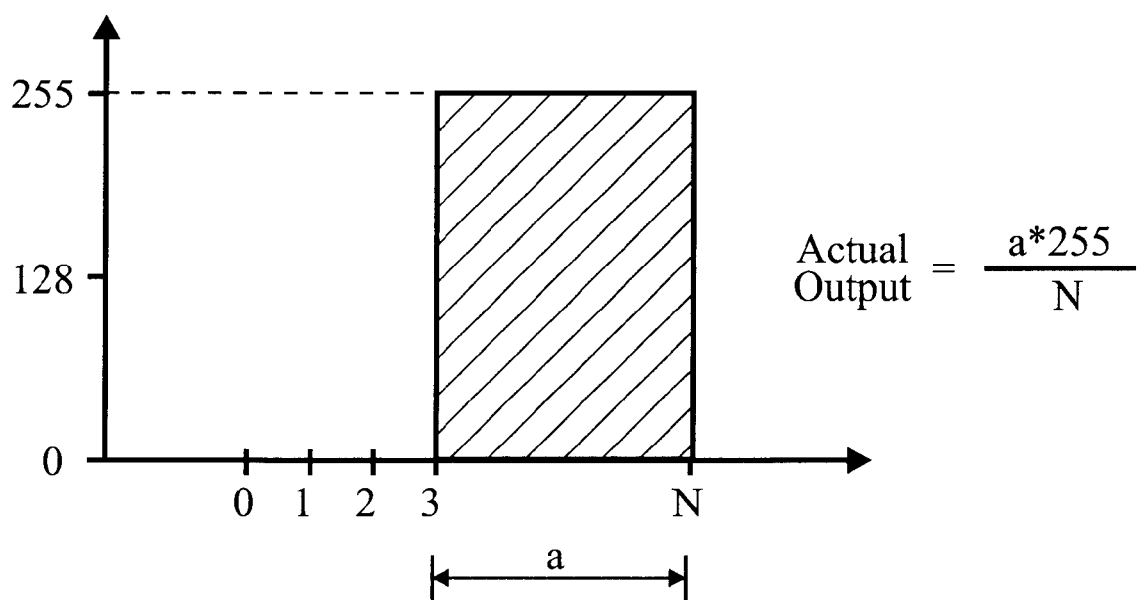
FIG. 27 shows a graphical representation of determining of number of subpixels exceeding or equal to a threshold value.
Figure 28:
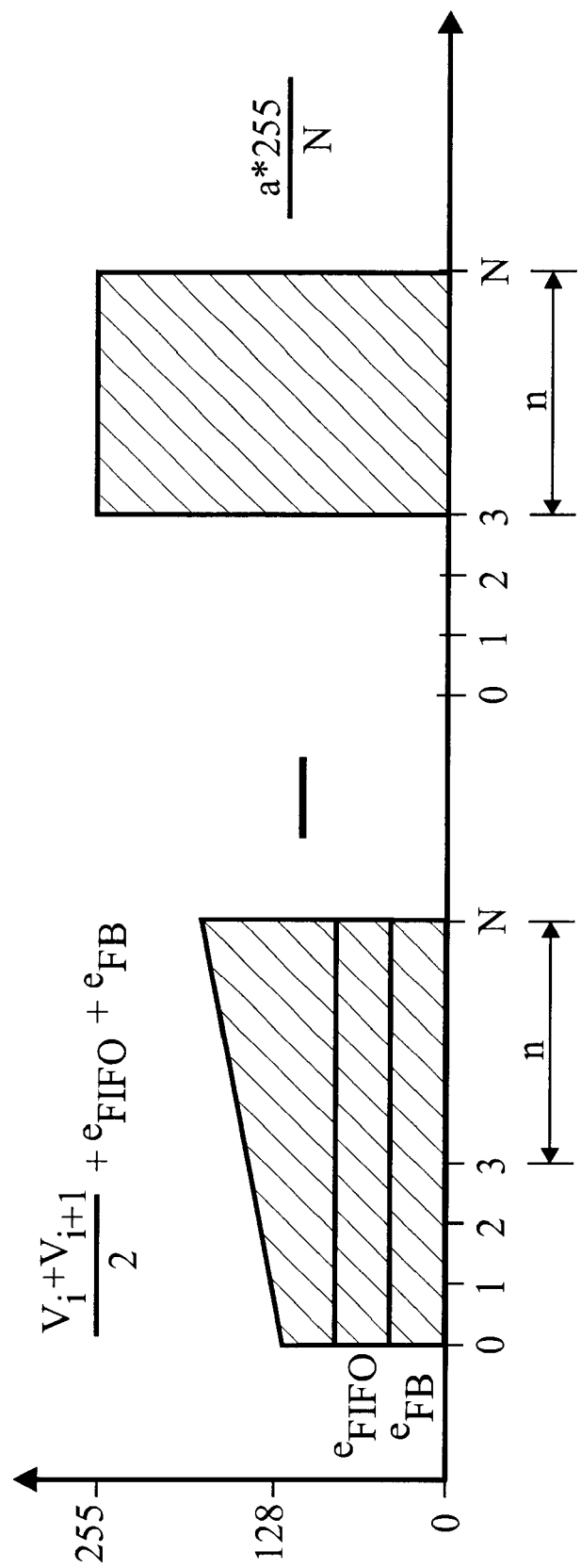
FIG. 28 shows a graphical representation of selecting one of the plurality of possible complete error values.

After completing these parallel computations, the next step includes the computations illustrated in FIGS. 26, 27, and 28. In this next step, each interpolated subpixel value is compared to a threshold value of 128, and the subpixels having a value greater than or equal to the threshold value are turned ON. This process is graphically illustrated in FIGS. 26 and 27 wherein FIG. 26 shows the comparison of the interpolated subpixel values with the threshold values, and FIG. 27 shows the turning ON of the subpixels which have a value greater than or equal to the threshold value.

Since all the possible error values were made simultaneously available as a result of the computations illustrated in FIG. 25, the error to be propagated downstream can now be immediately selected; i.e., via a multiplexer, based upon the number of subpixels which are turned ON. In other words, FIG. 28 illustrates the properly selected error value from the various simultaneously available error values produced by the computations illustrated in FIG. 25. The selected error value is then distributed to downstream pixels utilizing any conventional error diffusion technique. In the preferred embodiment of the present invention, the error is distributed to downstream pixels utilizing the error diffusion coefficients discussed above.

Figure 29:
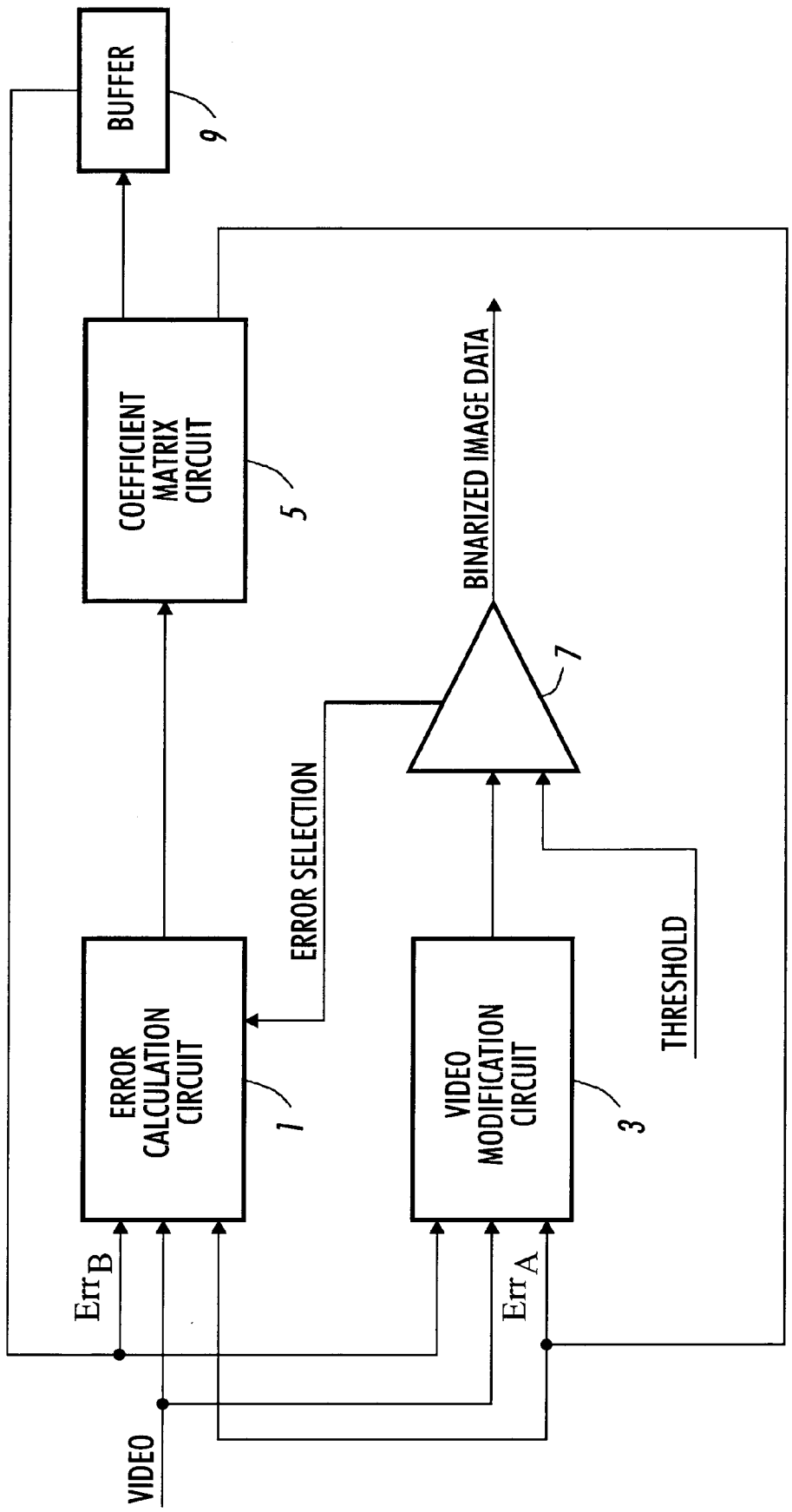
FIG. 29 is a block diagram illustrating implementation of the processes illustrated in FIGS. 20–28.

FIG. 29 illustrates a functional block diagram of the parallel pipeline high addressability error diffusion circuit of the preferred embodiment of the present invention. In FIG. 29, the input video signal is fed into an error calculation circuit 1 and a video modification circuit 3. The error components $e_{FIFO}$ ($Err_B$) and $e_{FB}$ ($Err_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 29, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 30:
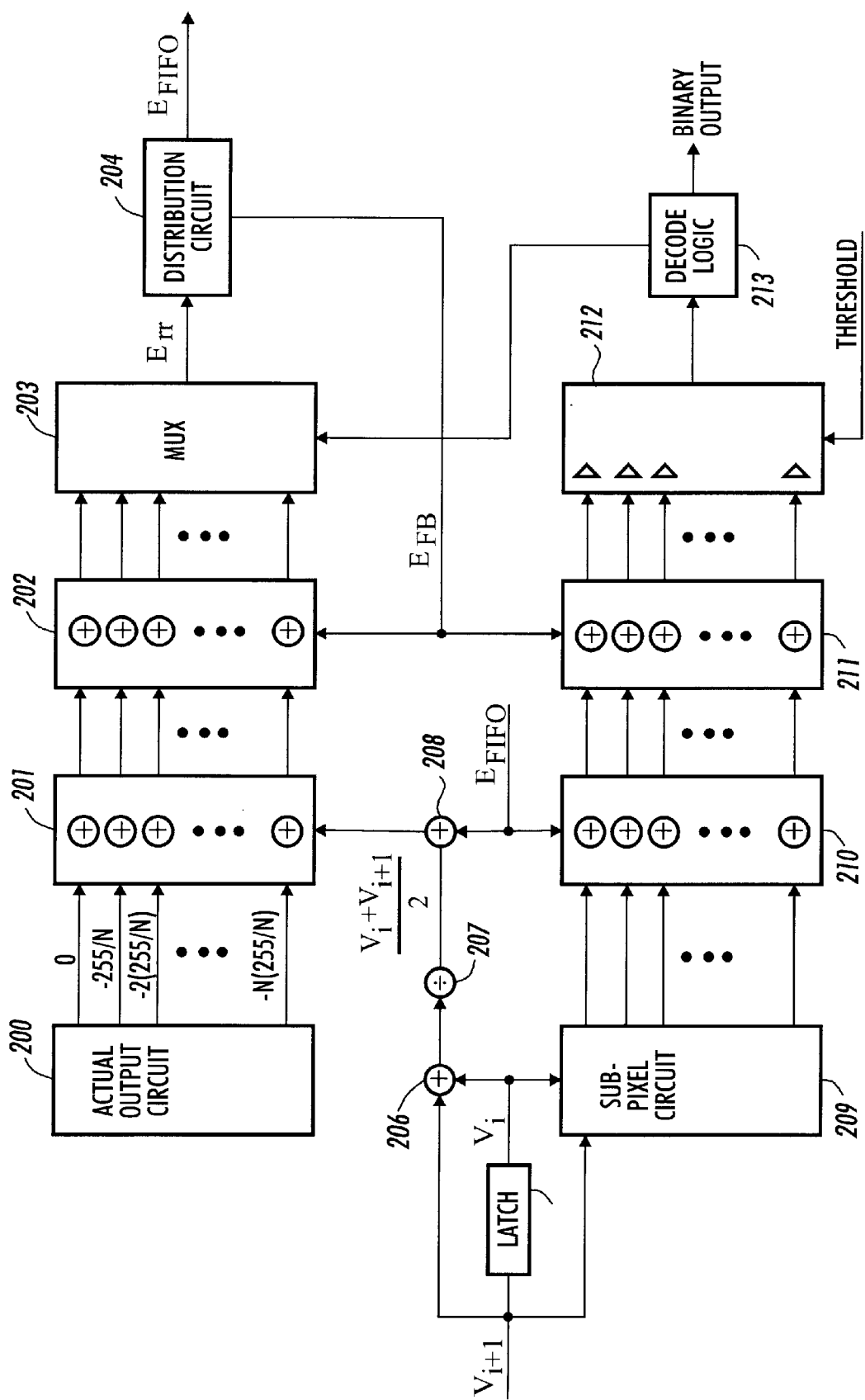
FIG. 30 is a block diagram illustrating circuitry implementation of the processes illustrated in FIGS. 20–28.

FIG. 30 illustrates a detail block diagram of the circuit of the preferred embodiment of the present invention. As illustrated in FIG. 30, many of the computations, as previously described with respect to FIGS. 20–28, are carried out in parallel.

Pixel values $V_i$ and $V_{i+1}$ are obtained by the utilization of a latch 205 which latches the video signal so that two adjacent fast scan pixels are available for processing. The pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for substraction operations. If the high addressability characteristic is N, N possible actual outputs will be generated. Also in parallel to the above described process, a subpixel circuit generated all the interpolated subpixels based on the pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

The combined screening and high addressability error diffusion rendering of the present invention can be utilized using a simple vertical line screen pattern as illustrated in FIG. 35. Moreover, the present invention can be utilized with a 45° line screen as illustrated in FIG. 36. The present invention can also be utilized with a dot screen or a constant screen. In the preferred embodiment of the present invention, a dot screen is utilized in a continuous tone region and a constant screen will be used in a text region to emulate a simple error diffusion process. This creates smoother transitions from window-to-window or from effect-to-effect since the error stored in the buffer will be within the same range for both continuous tone and text regions.

No matter what type of screen is used, the present invention is capable of realizing the characteristics of a high frequency screen while maintaining a high number of grey levels available for printing by the printing system. Thus, the present invention reduces the contouring artifacts typically observed with screens of limited grey level and is able to realize such a feature without affecting the typical image processing architecture of a printing system.

Lastly, if a high addressability error diffusion process with redistribution is performed on the pixel, the weighting coefficients illustrated in FIG. 5 would be chosen in the preferred embodiment of the present invention. A full description of the high addressability error diffusion process with redistribution is disclosed in copending U.S. patent application, U.S. patent application Ser. No. 08/285,265, filed concurrently herewith and will be discussed below.

Error diffusion is a well-known method of processing grey scale images on a binary output device. One of the key ingredients in error diffusion is a requirement to propagate or diffuse the error which is generated by reducing (binarizing) the grey level value of a grey scale image. In the traditional raster order process, approximately half the error is stored in a line buffer. Moreover, using weighting coefficients, the magnitude of each stored error term never exceeds the input grey level value (typically eight bits).

Recently, improved features have been added to the error diffusion method. Specifically, it has been proposed to utilize high addressability error diffusion. A brief description of high addressability error diffusion will follow.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Initially, the modified pixel values $P0_i=V_i+e_i$ and $P1_i=V_{i+1}+e_i$ are computed. The subpixels are denoted by 0 to N−1 wherein the high addressability characteristic is N=4. The interpolated subpixel values are computed as $B_n=P0+n(P1+P0)/N$ for n=0 to N−1. The interpolated subpixel values are then compared with a threshold value which in most cases is 128, assuming that the video value ranges from 0 to 255.

If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

More specifically, the inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

While high addressability improves the versatility of error diffusion, this feature, when combined with spot-overlap compensation and/or edge enhancement, however, tends to increase the magnitude of the error component which is propagated to the downstream pixels.

An example of error diffusion of overlapping dots is fully described in U.S. Pat. No. 5,087,981. The entire contents of U.S. Pat. No. 5,087,981 are hereby incorporated by reference.

An example of edge enhancement is fully described in U.S. Pat. No. 5,045,952. The entire contents of U.S. Pat. No. 5,045,952 are hereby incorporated by reference.

Moreover, further demands on image quality will inevitably increase the grey levels of images that are scanned, processed, and stored to over eight bits. As a result, the capacity of the line buffer or buffers used to store the distributed error term for subsequent scanlines also needs to be increased.

In response to the increasing number of grey levels for an image, it is desired to develop an error diffusion technique which reduces the memory requirements of the line buffer or buffers. By reducing the memory requirements, one can reduce the system's cost of implementing a multi-level error diffusion method. More specifically, the system's cost can be reduced by requiring only a small capacity First-In/First-Out line buffer (FIFO buffer) for storing the error term which is propagated to the pixels on the next scanline.

Figure 45:
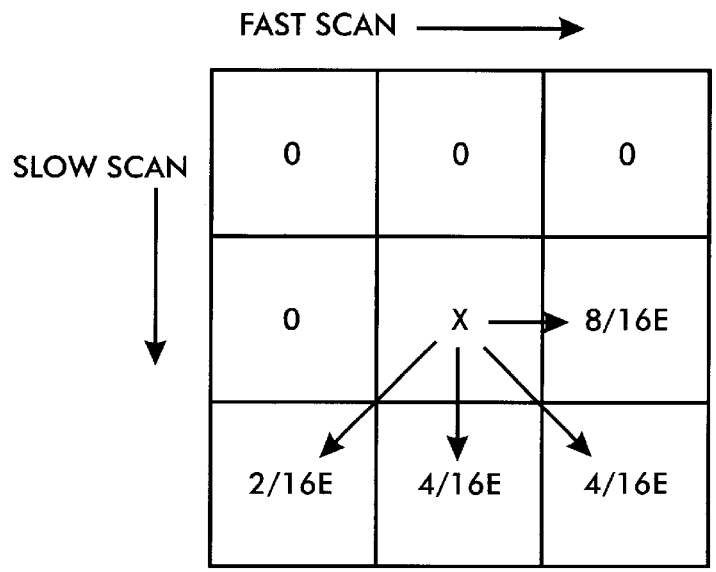
FIG. 45 shows a graphical representation of a typical error diffusion scheme.
Figure 46:
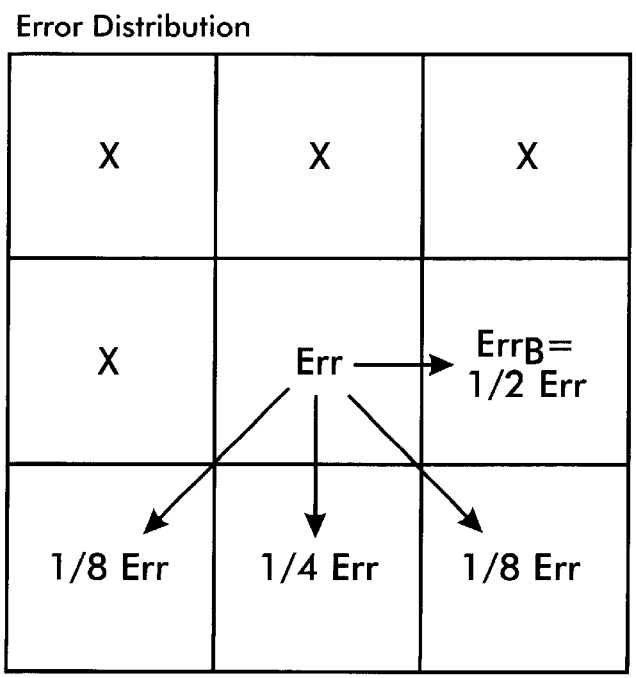
FIG. 46 shows a graphical representation illustrating actual distribution of the error in a typical error distribution routine.

FIGS. 45 and 46 depict a typical weighting scheme which diffuses the error term by utilizing a simple bit shifting routine to accomplish each weighting multiplication. As illustrated in FIG. 45, the weighting coefficient for the next pixel in the same scanline is eight sixteenths wherein the weighting coefficients for the three adjacent pixels in the next scanline are two sixteenths, four sixteenths, and two sixteenths. FIG. 46 illustrates the actual error distribution of the weighting scheme of FIG. 45. More specifically, the error produced from the processing of pixel X of FIG. 45 is distributed to four adjacent downstream pixels. The error distributed to the next pixel in the same scanline is equal to one-half of the error produced in the processing of the pixel data at pixel X of FIG. 45. The error for the next pixel in the next scanline is ⅛ of the error produced from processing the pixel data at pixel X of FIG. 45.

Figure 47:
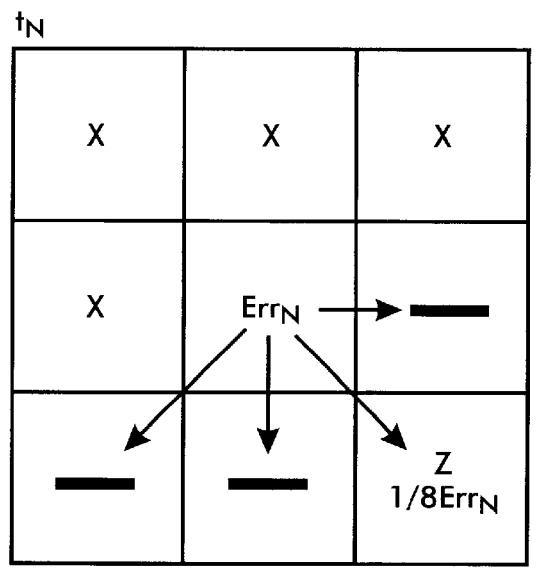
FIG. 47 shows a graphical representation of the error accumulated at a certain pixel at time N.
Figure 48:
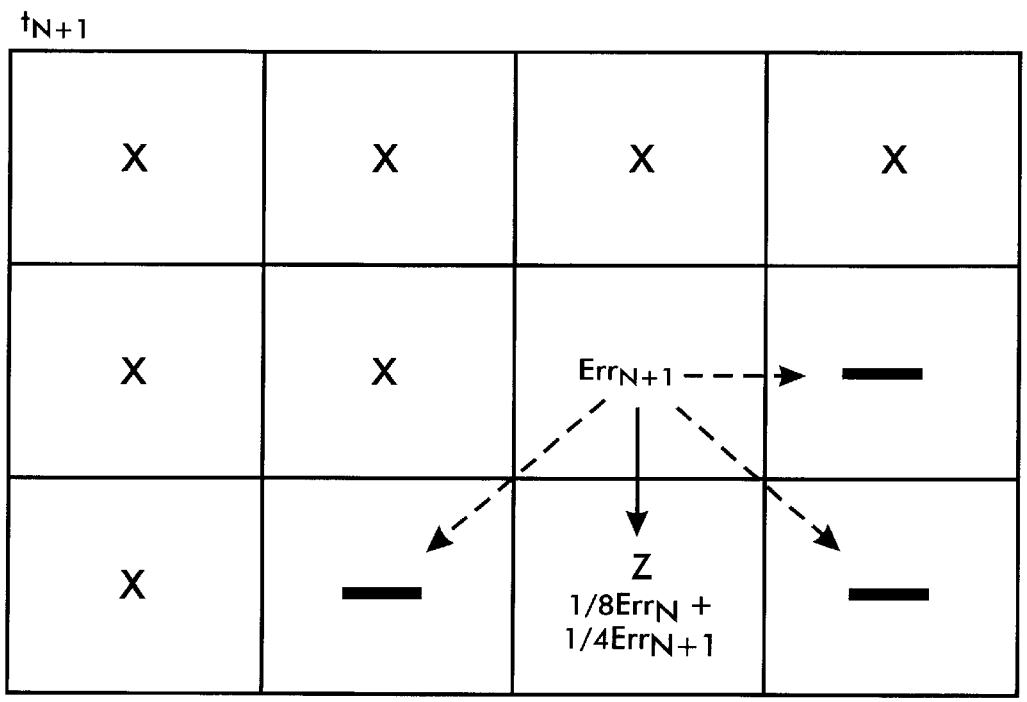
FIG. 48 shows a graphical representation of the error accumulated at a certain pixel and time N+1.
Figure 49:
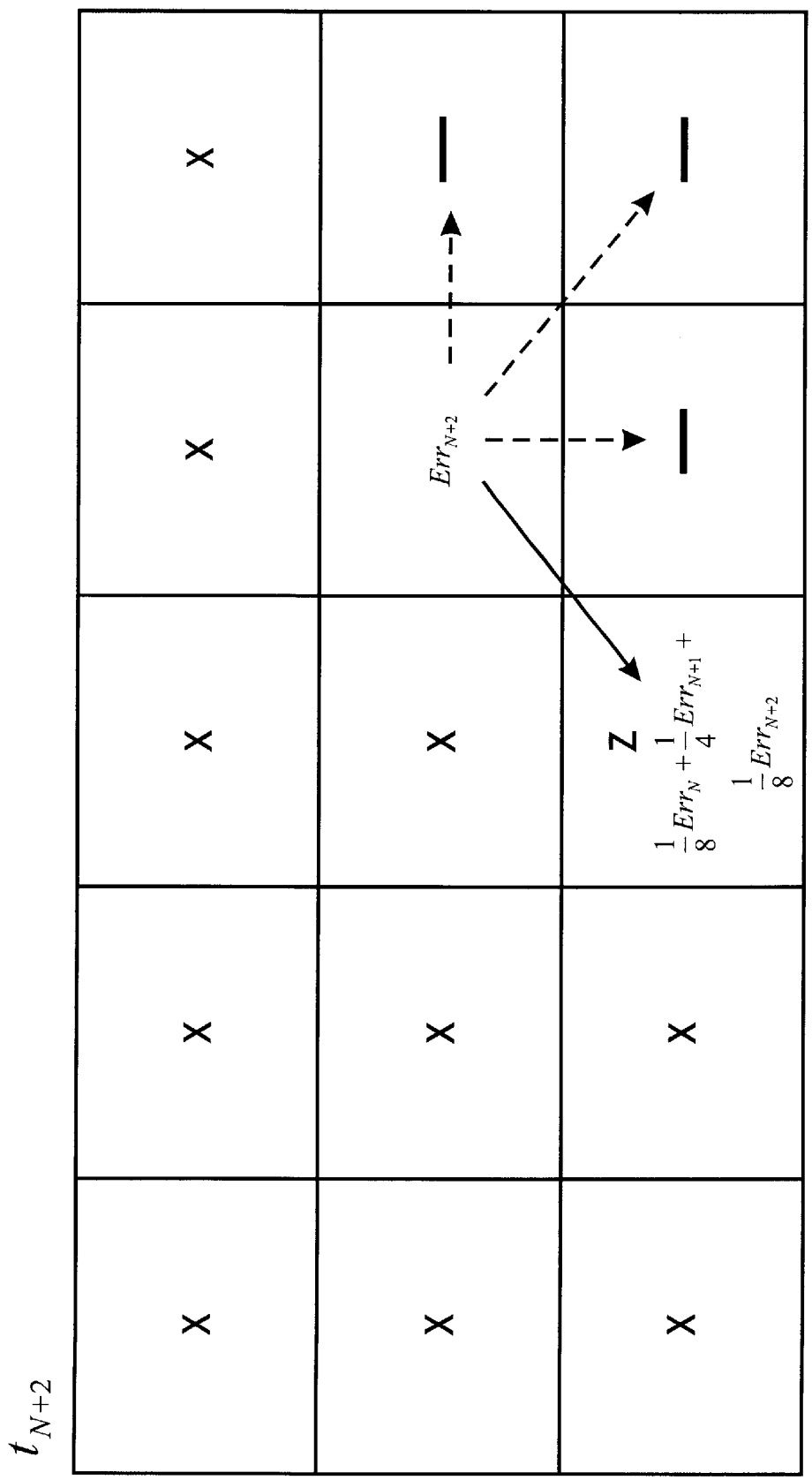
FIG. 49 shows a graphical representation Illustrating the error accumulated at a certain pixel at time N+2.

FIGS. 47–49 illustrate typical error summation for one pixel in the next scanline as a function of pixel location and time. More specifically, FIG. 47 illustrates the error distributed and accumulated at pixel Z at time N. FIG. 48 illustrates the error that has accumulated at pixel Z at time N+1. Lastly, FIG. 49 illustrates the error accumulated at pixel Z at time N+2. It is noted that at each instance in time, a new error is produced from processing a pixel in the previous combine and that error is distributed to pixel Z as a function of different weighting coefficients depending upon the instant in time or the location of the pixel being processed.

Figure 50:
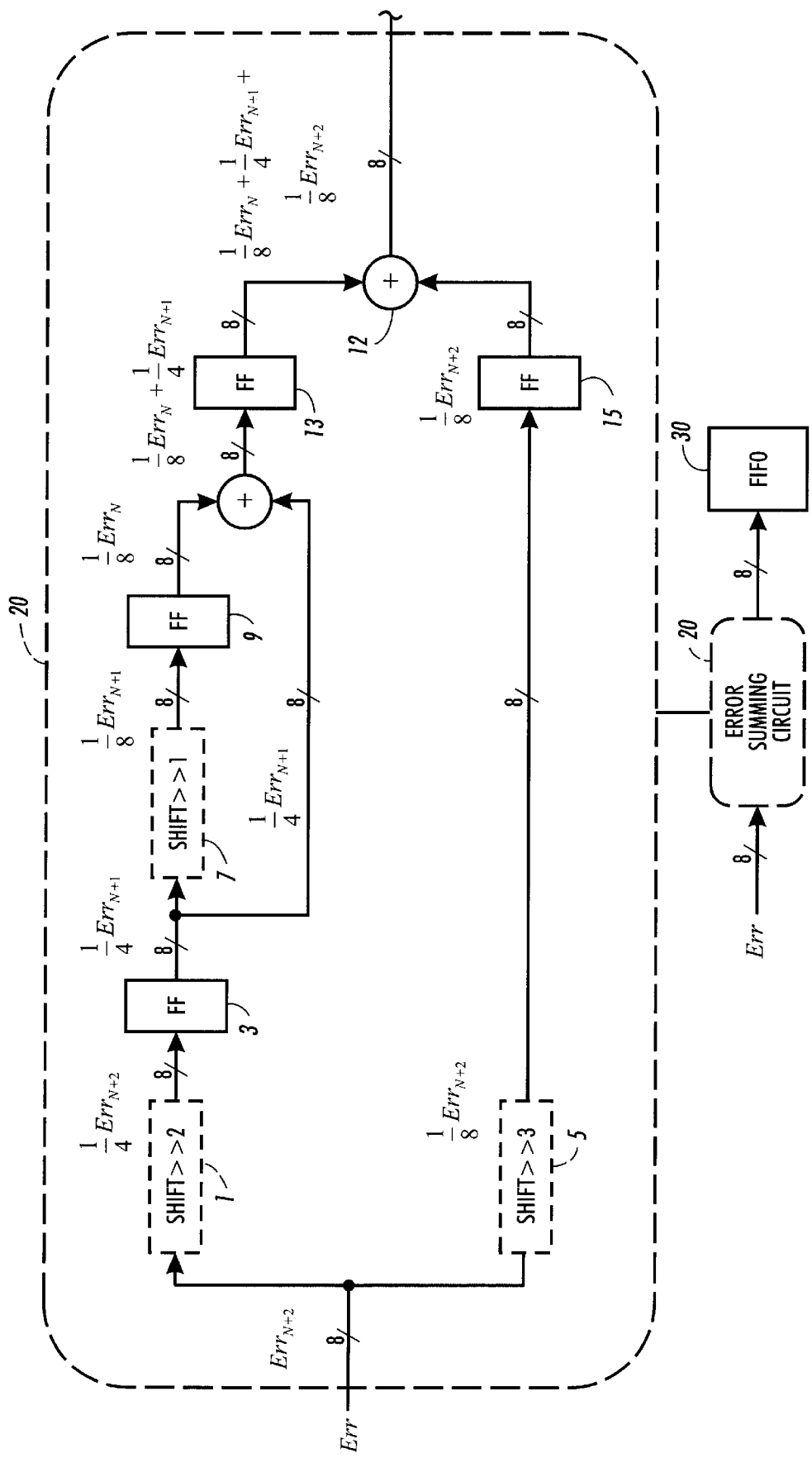
FIG. 50 Illustrates a typical error summing circuit utilized in an error diffusion process.
Figure 51:
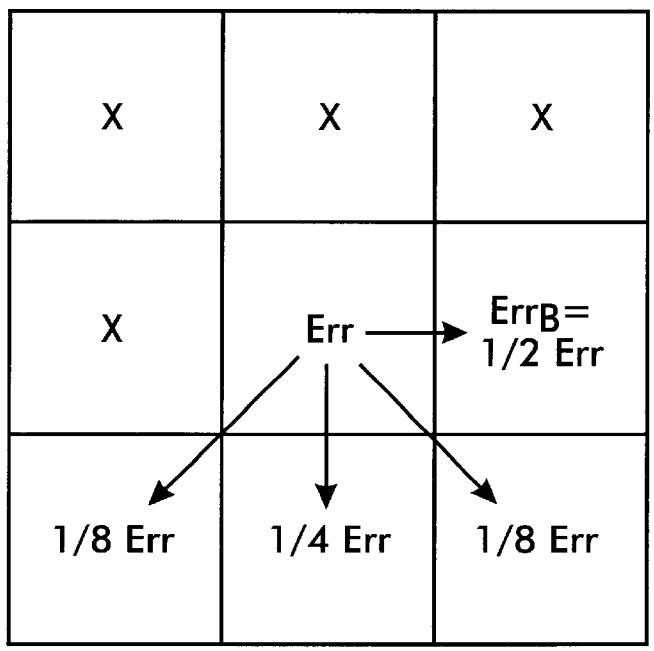
FIG. 51 shows a graphical representation of the distribution of error from processing the single pixel according to the present invention.

FIG. 50 illustrates a block diagram of the typical hardware which corresponds to the summing circuit utilized to realize the results depicted in FIGS. 47–49. In FIG. 50, the error, an eight-bit dataword, is fed into an error summing circuit 20. The error summing circuit 20 sums the various errors from adjacent pixels to produce an eight-bit dataword which is stored in a FIFO buffer 30 so that when the image processing proceeds to that particular pixel, the error associated with that pixel can be used to modify the video signal before processing.

FIG. 50 further illustrates a detailed diagram of the error summing circuit 20. In the detailed diagram, flip-flops 3, 9, 13, and 15 are utilized to store past error values. For example, flip-flop 3 stores the past error value of ¼ $Err_{N+1}$, whereas flip-flop 15 stores the past error of ⅛ $Err_{N+2}$. The error summing circuit 20 also includes shifting circuits 1, 5, and 7 which provide a result representing the past error scaled by the proper weighting coefficients. Lastly, the detailed diagram of the error summing circuit 20 includes adders 11 and 12 which actually sum the weighted errors to produce the total weighted error for a particular pixel. It is noted that each flip-flop corresponds to one pixel delay.

As mentioned above, the new features which have been used to modify the typical error diffusion method have increased the memory requirements of the FIFO line buffer. More specifically, in the modified high addressability error diffusion method, the magnitude of the error component can reach as high as 12 bits. To store such a 12 bit error, two 8-bit FIFO line buffers would be required since a 12-bit line buffer is a non-standard component. By utilizing two 8-bit FIFO line buffers, one has essentially doubled the cost of memory for the error diffusion method.

As noted above, to maintain present memory requirements and still be able to implement new error diffusion features, the width of the error dataword must be reduced; i.e., the number of bits must be reduced. By reducing the number of bits in the error term, the need for additional buffers can be avoided.

One approach to avoid the need for additional line buffers would be to truncate the least significant bits (LSBs) of the error component and send only the eight most significant bits (MSBs) to the FIFO line buffer (assuming an eight bit buffer is used). In other words, if a 12 bit error component is being produced by a high addressability error diffusion method, the four LSBs of the error component would be truncated or clipped, and only the 8 MSBs would be sent to the FIFO buffer. However, this approach is not desirable since to render images with high quality, the full error should be maintained and distributed.

Another approach to eliminate the need for additional line buffers would be to again truncate the LSBs of the error component and send only the 8 MSBs to the FIFO line buffer (assuming an eight bit buffer is used). However, in this approach, the truncated LSBs of the error component would be redistributed to the error component of another downstream pixel in the same scanline or different scanline.

As noted above, an important requirement for rendering images with high image quality is to maintain and distribute the error which is generated from transforming the grey input video into a binary image. Thus, by redistributing the LSBs of the stored error back into the error summation circuit for the next pixel's error accumulation process prior to the accumulated error for the next pixel being sent to the FIFO line buffer, the total number of bits that are sent to the FIFO line buffer can be limited to eight bits or lower, depending upon the application, and the diffused error is preserved throughout the image, thus rendering images with high print quality.

FIGS. 51–54 illustrate the error summation for one pixel utilizing the error redistribution technique of the second approach, the preferred embodiment of the present invention. It is noted that the errors that are distributed to the adjacent downstream pixels are weighted utilizing the same coefficients as illustrated in FIG. 46. However, it is noted that any weighting scheme can be utilized depending upon the application being used.

Figure 52:
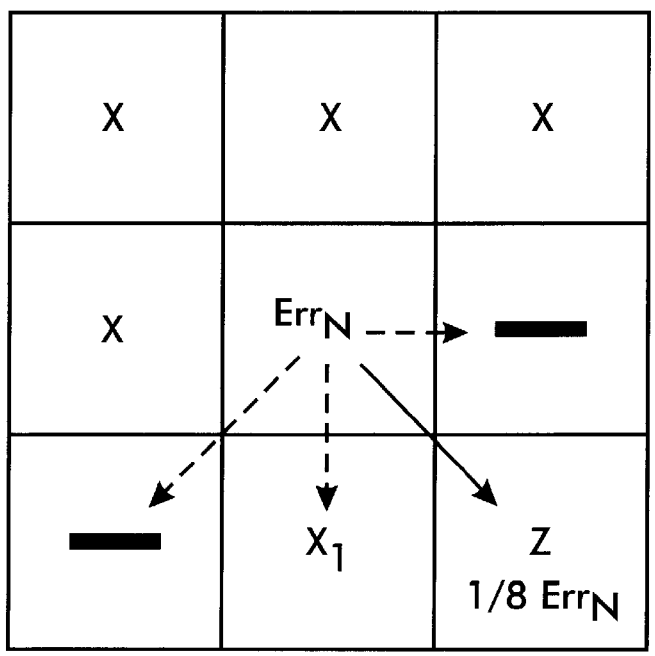
FIG. 52 shows a graphical representation illustrating the error accumulated at a certain pixel at time N according to the present invention.
Figure 53:
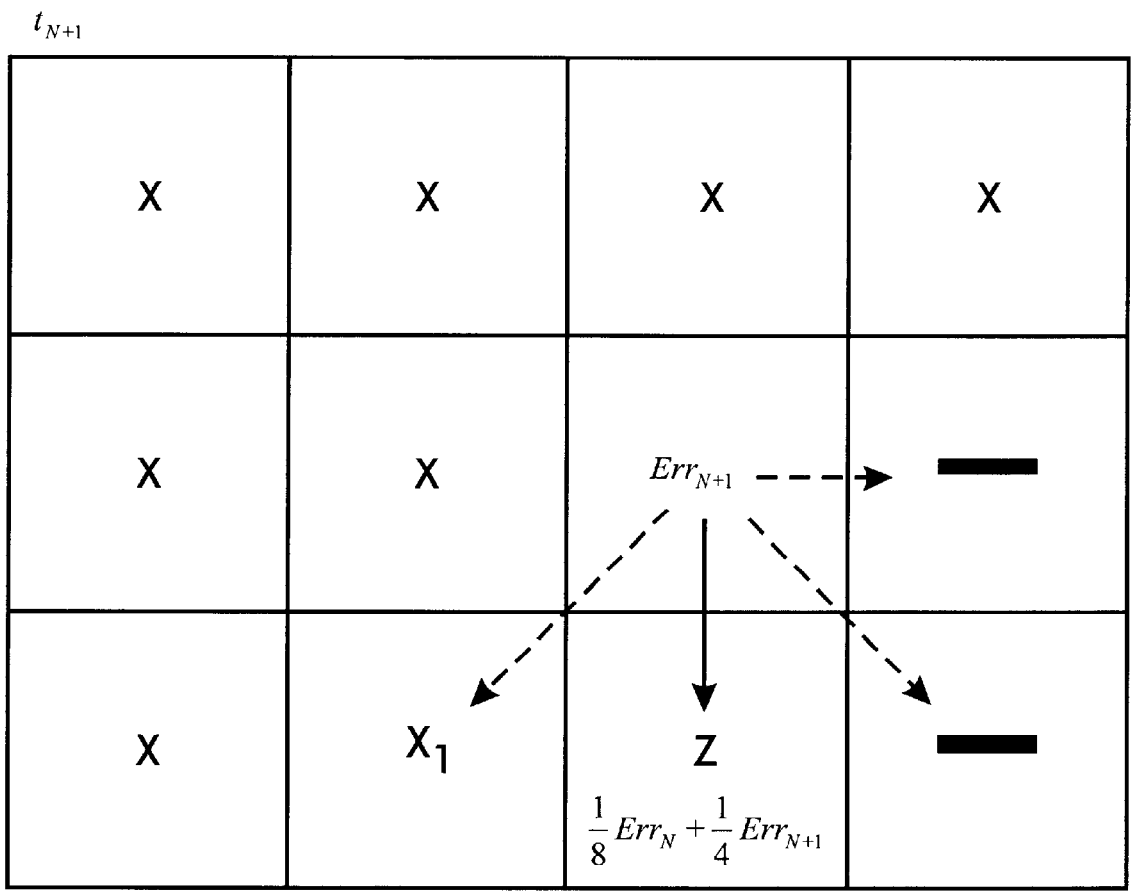
FIG. 53 shows a graphical representation illustrating the error accumulated at a certain pixel at time N+1 according to the present invention.

As in FIG. 47, FIG. 52 illustrates the error distributed to and accumulated at pixel Z during time N. Moreover, as in FIG. 48, FIG. 53 illustrates the error accumulated at pixel Z at time N+1. The actual error being accumulated, as illustrated in FIGS. 52 and 53, is essentially the same error accumulated in FIGS. 47 and 48.

Figure 54:
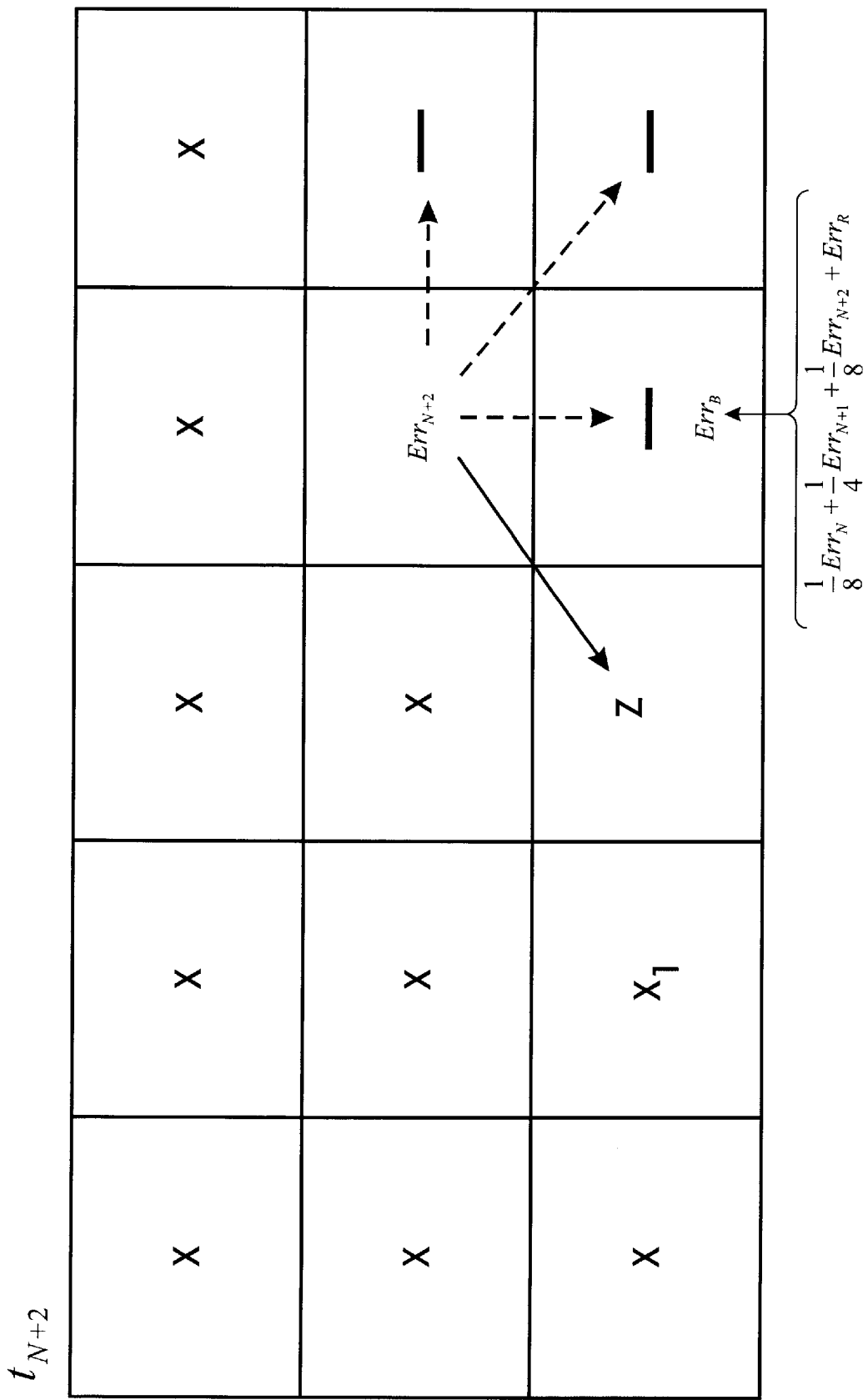
FIG. 54 shows a graphical representation illustrating the error accumulated at a certain pixel at time N+2 according to the present invention.

In FIG. 54, the error accumulated at pixel Z at time N+2 is the same error accumulated in FIG. 49 with the addition of the error term $Err_R$. The error term $Err_R$ represents the LSBs of the summed error term for the pixel $X_1$. In other words, the error ($Err_B$) accumulated at pixel Z at time N+2 is a summation of four separate error terms wherein three of the error terms are as a result of the processing of three pixels in the previous scanline and one of the error terms $Err_R$ is a result of the truncation of summed error term of the previous pixel in the same scanline, namely pixel $X_1$ as illustrated in FIG. 54.

Figure 55:
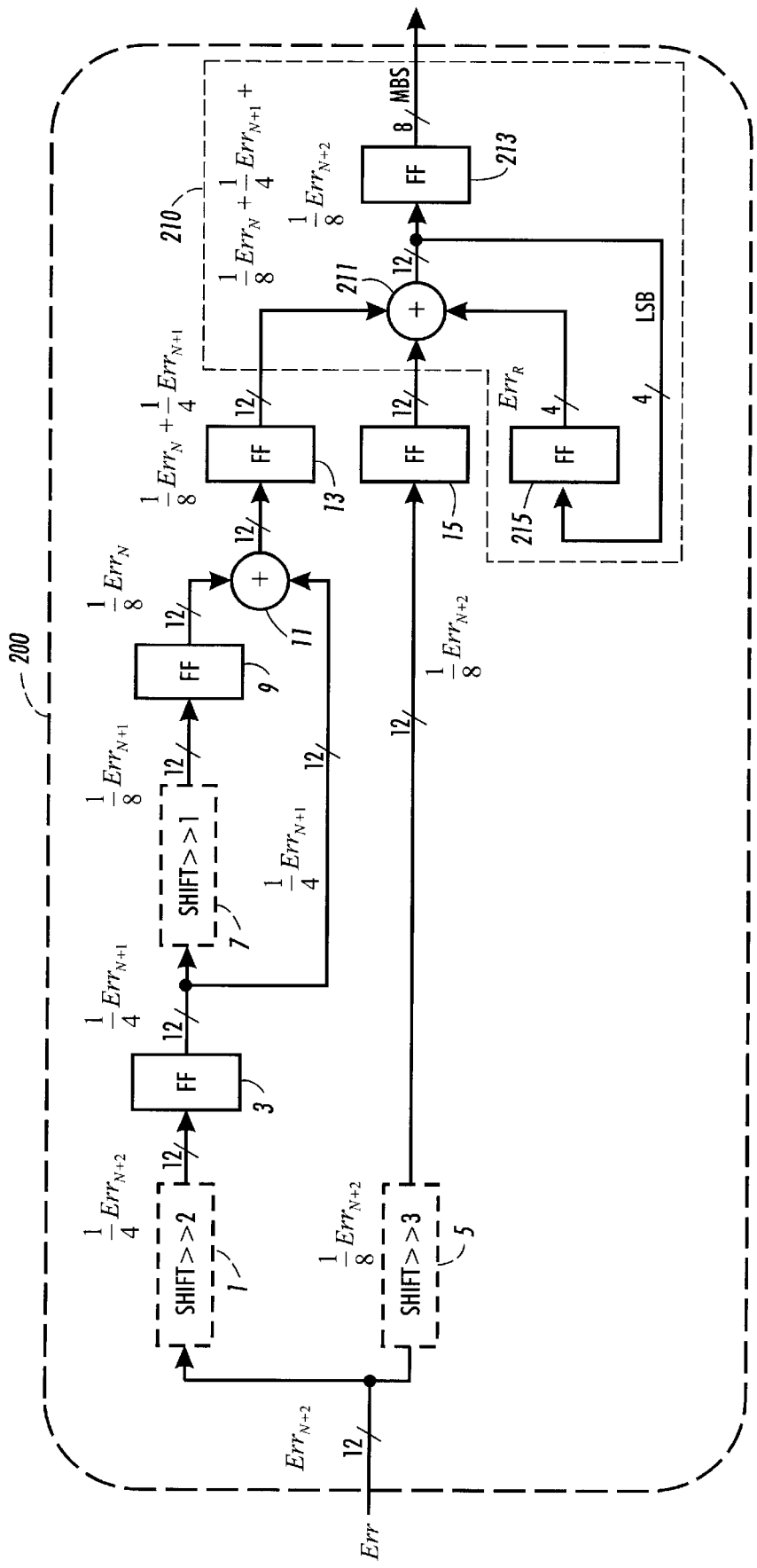
FIG. 55 shows a block diagram illustrating the error redistribution circuit of the present invention.

FIG. 55 shows a block diagram illustrating one embodiment of the error redistribution circuit of the present invention. The block diagram of FIG. 55 is substantially the same as the circuit illustrated in FIG. 50 except for the addition of two extra flip-flops and one three-input adder. More specifically, an error redistribution circuit 210 replaces the two-input adder 12 of the error summing circuit 20 illustrated in FIG. 50.

In this error redistribution circuit 210, the various error components from the typical error summing routine are fed into adder 211. Moreover, the LSBs resulting from the truncation of the previous error summing routine are fed into adder 211. This truncation error ($Err_R$) is stored from the previous error summation routine in flip-flop 215. As a result of the summation, adder 211 outputs an error component greater than eight bits.

In the example illustrated in FIG. 55, the error component comprises 12 bits. However, it is noted that the number of bits in the error component are not important since the important feature of the present invention is the truncation of the LSBs of the error component for reducing the length of the error dataword and for redistribution to the next error summing routine.

Thus, as illustrated in the example of FIG. 55, the four LSBs from the 12-bit output of adder 211 are fed into flip-flop 215. The remaining 8 MSBs are fed into flip-flop 213 which are stored prior to being fed into the FIFO line buffer 30 of FIG. 50.

Figure 56:
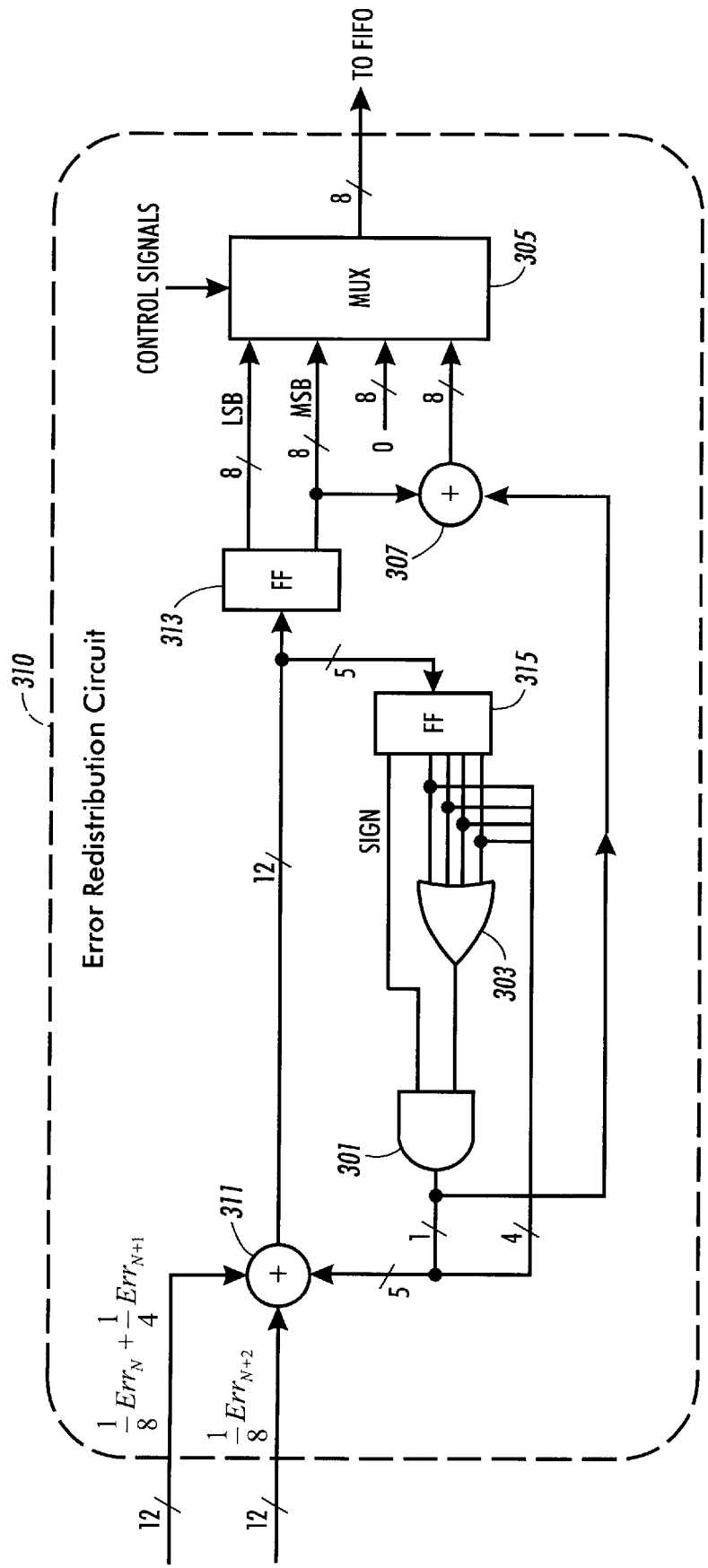
FIG. 56 shows a block diagram illustrating an error redistribution circuit of the present invention including a circuit for preventing the redistribution of a negative zero value.

FIG. 56 illustrates the error redistribution circuit of the preferred embodiment of the present invention. As in FIG. 55, the error terms from the three pixels processed in the previous scanline are fed into an adder 311 as well as 5 bits representing the redistributed error from the previous error summing routine. In this error redistribution circuit, the actual sign of the error component produced by the adder 311 is utilized in the redistribution of the LSBs of the error term.

More specifically, a flip-flop 315 stores the LSBs of the error component produced by adder 311 as well as the sign bit, whereas flip-flop 313 stores the MSBs of the error component produced by adder 311. From flip-flop 315, the LSBs of the error component are fed to an OR gate 303 wherein the ORed results are fed into an AND gate 301. The sign bit from flip-flop 315 is also fed into AND gate 301 wherein the ANDed results are fed into adder 311 and adder 307. It is further noted that the LSBs output from flip-flop 315 are also fed to adder 311 to ensure proper error redistribution.

The ANDed results from AND gate 301 are added with the MSBs stored at flip-flop 313 wherein this summation is fed to a multiplexer 305. The MSBs of flip-flop 313 are also fed to the multiplexer 305 as well as a zero value. It is noted that the LSBs of flip-flop 313 can also be fed to multiplexer 305 for utilization in certain situations. Control signals control the multiplexer to select either the MSBs received from flip-flop 313, LSBs received from flip-flop 313, the zero value, or the summation received from adder 307. The selected value is then fed to the FIFO buffer.

The circuit illustrated in FIG. 56 prevents a negative zero error from being redistributed. Moreover, it is noted that adder 307 adds a 1 for error redistribution when any of the LSBs are asserted and the sign bit indicates a negative number.

The selection by the multiplexer is operated according to the following parameters. The MSBs from the flip-flop 313 are selected when truncating the error component and no error redistribution is desired. If available, the eight LSBs from the flip-flop 313 are selected when the error component is small enough to be stored in the FIFO buffer, thereby negating a need for error redistribution, such as when the process does not produce a large error value (an error value over eight bits). Moreover, the zero value is selected when no error diffusion is desired; and the summation from adder 307 is selected when error diffusion with error redistribution is the desired process. In other words, the circuit illustrated in FIG. 56 allows the image processing module to control whether error diffusion will be implemented or not, and if it is implemented, whether it is implemented with or without error redistribution as described in the present application. The selection of these various modes of operation can be controlled by a conventional auto segmentation or image segmentation routine such as described in copending U.S. patent application, Ser. No. 08/163,784. The entire contents of Ser. No. 08/163,784 are hereby incorporated by reference.

The present invention truncates or splits the error component produced by the typical error summing circuit so that only a portion of the produced error component is stored in a FIFO line buffer for utilization in future image processing routines. The truncated or non-stored component of the error component is fed back to the error summing circuit to retain image quality. Therefore, the present invention is readily applicable to any size dataword, and is not necessarily restricted to routines having error components greater than 8 bits.

Moreover, the present invention reduces the memory requirements of the line buffer while at the same time maintaining the same level of image quality when compared against images processed via typical error diffusion. This error redistribution technique has increased importance when utilizing an error diffusion technique such as the high addressability error diffusion process discussed above. The general concepts of the present invention can also be utilized in other applications such as color error diffusion to further decrease the memory requirements, but maintain the same level of image quality.

Another application of the concepts of the present invention is the utilization of two different error diffusion matrices, in a single image, for portions of the image which are determined to have relatively low or relatively high intensity regions, a relatively large diffusion matrix like that shown in FIG. 9 can be used for the binarization process. For portions of the image which are determined to have mid-level grey values, the error diffusion matrix of FIG. 8 can be used.

Although the present invention has been described in detail above, various modifications can be implemented without departing from the spirit of the present invention. For example, the preferred embodiment of the present invention has been described with respect to a printing system; however, this dynamic error diffusion method is readily implemented in a display system. Moreover, the high addressability error diffusion method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Furthermore, the present invention has been described as having the set of weighting coefficients prestored in a memory device, such as a ROM or EPROM, but the present invention also contemplates the utilization of a processor which performs a predetermined algorithm to generate the set of weighting coefficients, and thus the utilization of a large look-up table can be avoided.

Lastly, the present invention has been described with respect to a monochrome or black/white environment. However, the concepts of the present invention are readily applicable to a color environment. Namely, the dynamic error diffusion process of the present invention can be applied to each color space value representing the color pixel.

In recapitulation, the present invention provides a dynamic error diffusion method or module which enables an image processing system to convert an electronic document of one format to that of another format.

While the present invention has been described with reference to various embodiments disclosed herein before, it is not to be combined to the detail set forth above, but is intended to cover such modifications or changes as made within the scope of the attached claims.

What is claimed is:

1. A method of diffusing an error generated from thresholding a grey level value representing a pixel, comprising the steps of:
   (a) assigning an image characteristic to a pixel within an image;
   (b) thresholding said pixel;
   (c) generating an error value as a result of the threshold process in said step (b);
   (d) selecting a set of weighting coefficients from a plurality of possible weighting coefficient sets based on the assigned image characteristic of said pixel; and
   (e) diffusing the error value to adjacent pixels based on the selected set of weighting coefficients.

2. The method as claimed in claim 1, wherein the image characteristic is an image type.

3. The method as claimed in claim 1, wherein the image characteristic is image density information.

4. The method as claimed in claim 1, wherein said step (b) comprises the substeps of:
   (b1) receiving the pixel having a grey level value of a first resolution;
   (b2) converting the grey level value into a predetermined number of subpixels representing a second resolution, the second resolution being higher than the first resolution; and
   (b3) thresholding the subpixels.

5. The method as claimed in claim 4, wherein said substep (b2) comprises the substeps of:
   (b2i) computing a first grey level value from the pixel;
   (b2ii) computing a second grey level value from the pixel; and
   (b2iii) computing a predetermined number of subpixels $B_n$, the subpixels $B_n$ being equal to $P0+n(P1-P0)/N$, wherein n is equal to 0 to N−1, P0 is equal to the first grey level value, P1 is equal to the second grey value, and N is equal to a high addressability characteristic.

6. The method as claimed in claim 5, wherein said step (c) comprises the substeps of:
   (c1) calculating a desired output equal to a sum of the first and second grey level values divided by two;
   (c2) calculating an actual output equal to a number of subpixels being equal to or greater than a threshold value multiplied by a maximum grey level value for a pixel divided by a high addressability characteristic; and
   (c3) calculating the error to be equal to the desired output minus the actual output.

7. The method as claimed in claim 5, further comprising the step of:
   (f) adding a screen threshold value to said pixel prior to the execution of said step (b).

8. The method as claimed in claim 7, wherein said step (c) comprises the substeps of:
   (c1) calculating a desired output equal to a sum of the first and second grey level values divided by two;
   (c2) calculating an actual output equal to a lowest screen value of the screen plus a number of subpixels being equal to or greater than a threshold value multiplied by a difference between a maximum screen value of the screen and the lowest screen value of the screen divided by a high addressability characteristic; and
   (c3) calculating the error value to be equal to the desired output minus the actual output.

9. A system for diffusing an error from thresholding a grey value representing a pixel, comprising:
   image segmentation means for assigning an image characteristic of to a pixel within an image;
   threshold means for thresholding said pixel and for generating an error value as a result of the threshold process;
   coefficient means, operatively connected to said image segmentation means, for generating a set of weighting coefficients from a plurality of possible weighting coefficient set based on the assigned image characteristic of said pixel; and
   diffusing means, operatively connected to said threshold means and coefficient means, for diffusing the error value to adjacent pixels based on the generated set of weighting coefficients.

10. The system as claimed in claim 9, wherein said image segmentation means determines whether the pixel within the image is text, continuous tone or halftone such that the image characteristic reflects a determined image type.

11. The system as claimed in claim 9, wherein said image segmentation means determines an image density of the pixel within the image such that the image characteristic reflects a determined density.

12. The system as claimed in claim 9, further comprising:
   means for receiving the pixel having a first resolution; and
   high addressability means for converting the grey level value into a predetermined number of subpixels representing a second resolution, the second resolution being higher than the first resolution;
   said threshold means thresholding the subpixels.

13. The system as claimed in claim 12, further comprising:
   screen means for screening the pixel with a predetermined screen prior to said high addressability means converting the grey level value to the predetermined number of subpixels.

14. A method of binarizing a multi-level pixel, comprising the steps of:
- (a) identifying areas of an image to be processed by a set of first image processing operations and areas of the image to be processed by a set of second image processing operations;
- (b) processing the multi-level pixel with the set of first image processing operations when the multi-level pixel is in an area identified as to be processed by the set of first image processing operations and generating an error and binary value therefrom;
- (c) processing the multi-level pixel with the set of second image processing operations when the multi-level pixel is in an area identified as to be processed by the set of second image processing operations and generating an error and binary value therefrom;
- (d) distributing a weighted portion of the error to unprocessed pixels based on a first set of weighting coefficients when the multi-level pixel is processed by said step (b); and
- (e) distributing a weighted portion of the error to unprocessed pixels based on a second set of weighting coefficients when the multi-level pixel is processed by said step (c).

15. A printing system for rendering marks on a receiving medium, comprising:

receiving means for receiving a pixel having a first resolution;

first image processing means for screening the pixel with a predetermined screen;

second image processing means for converting the grey level value into a predetermined number of subpixels representing a second resolution, the second resolution being higher than the first resolution;

third image processing means for binarizing the predetermined number of subpixels so as to output a binary signal and an error, the error having a resolution equal to the first resolution;

image segmentation means, operatively connected to said receiving means, said first image processing means, said second image processing means, and said third image processing means, for determining an image characteristic of a pixel within an image and for controlling operations of said first, second and third image processing means;

coefficients means, operatively connected to said image segmentation means, for generating a first set of weighting coefficients when said first, second and third image processing means are operated in sequence and for generating a second set of weighting coefficients when said second and third image processing means are operated in sequence and said first image processing means is rendered nonoperational by said image segmentation means;

diffusing means, operatively connected to said coefficients means, for diffusing the error to adjacent pixels based on the set of weighting coefficients generated by said coefficients means; and rendering means for converting the binary signal into a mark on the receiving medium.

* * * * *